(12) United States Patent
Panwar et al.

(10) Patent No.: US 7,986,637 B2
(45) Date of Patent: Jul. 26, 2011

(54) ON DEMAND PEER-TO-PEER VIDEO STREAMING WITH MULTIPLE DESCRIPTION CODING

(75) Inventors: Shivendra S. Panwar, Freehold, NJ (US); Keith W. Ross, New York, NY (US); Yao Wang, Matawan, NJ (US)

(73) Assignee: Polytechnic University, Brooklyn, NY (US)

( * ) Notice: Subject to any disclaimer, the term of this patent is extended or adjusted under 35 U.S.C. 154(b) by 0 days.

(21) Appl. No.: 12/613,388

(22) Filed: Nov. 5, 2009

(65) Prior Publication Data

US 2010/0049867 A1    Feb. 25, 2010

Related U.S. Application Data

(63) Continuation of application No. 11/337,833, filed on Jan. 23, 2006, now Pat. No. 7,633,887.

(60) Provisional application No. 60/646,080, filed on Jan. 21, 2005.

(51) Int. Cl.
*H04L 12/28* (2006.01)

(52) U.S. Cl. ........ 370/254; 370/432; 709/219; 709/231; 709/239

(58) Field of Classification Search ................... 370/254, 370/432; 709/219, 231, 239
See application file for complete search history.

(56) References Cited

U.S. PATENT DOCUMENTS

| | | | |
|---|---|---|---|
| 7,046,733 B2 | 5/2006 | Bushmitch et al. | |
| 2003/0009535 A1* | 1/2003 | Apostolopulos et al. | 709/219 |
| 2003/0009589 A1* | 1/2003 | Apostolopoulos et al. | 709/239 |
| 2004/0143672 A1* | 7/2004 | Padmanabham et al. | 709/231 |
| 2006/0007947 A1* | 1/2006 | Li et al. | 370/432 |
| 2007/0097885 A1 | 5/2007 | Traversat et al. | |
| 2007/0174471 A1 | 7/2007 | Van Rossum | |
| 2008/0155120 A1* | 6/2008 | Argawal et al. | 709/242 |
| 2008/0307107 A1* | 12/2008 | Chen et al. | 709/231 |
| 2009/0259710 A1* | 10/2009 | Porio et al. | 709/201 |
| 2010/0229222 A1* | 9/2010 | Li et al. | 726/5 |

OTHER PUBLICATIONS

Albanese et al., "Priority encoding transmission," IEEE Trans. Inform. Theory, Nov. 1996, 1737-1744.
Davis et al., "Joint source and channel coding for image transmission over lossy packet networks," Proc. SPIE Conf. Wavelet Application to Digital Image Processing, Aug. 7-9, 1996.
Mohr et al., "Approximately optimal assignment for unequal loss protection," Proc. IEEE Int. Conf. Image Processing, Sep. 10-13, 2000.

(Continued)

*Primary Examiner* — Albert T Chou
(74) *Attorney, Agent, or Firm* — Woodcock Washburn LLP

(57) ABSTRACT

A peer-to-peer novel video streaming scheme is described in which each peer stores and streams videos to the requesting client peers. Each video is encoded into multiple descriptions and each description is placed on a different node. If a serving peer disconnects in the middle of a streaming session, the system searches for a replacement peer that stores the same video description and has sufficient uplink bandwidth. Employing multiple description coding in a peer-to-peer based network improves the robustness of the distributed streaming content in the event a serving peer is lost. Video quality can be maintained in the presence of server peers being lost. The video codec design and network policies have a significant effect on the streamed video quality. The system performance generally improves as the number of descriptions M for the video increases, which implies that a higher video quality can be obtained with the same network loading.

19 Claims, 16 Drawing Sheets

OTHER PUBLICATIONS

MoMusys code, "MPEG4 verification model version 18.0," ISO/IECJTC1/SC29/WG11 Coding of Moving Pictures and Audio, Jan. 2001.

Puri et al., "Multiple-description source coding using forward error correction codes," 33$^{rd}$ Asilomar Cong. Signals, Systems and Computers, Oct. 24-27, 1999.

Reibman et al., "Multiple Description Video Coding using Motion-Compensated Temporal Prediction," IEEE Trans. Circuit and System for Video Technology, Mar. 2002, 193-204.

Screen Shot from the Webpage: pplive.com/English/index.shtml, on Jan. 23, 2006.

Stankovic et al., "Packet loss protection of embedded data with fast local search," Proc. IEEE Int. Conf. Image Processing, Sep. 22-25, 2002.

Wang et al., "Multiple description coding for video delivery," Proc. IEEE Special Issue on recent advances in video coding and delivery, Jan. 2005.

Wang et al., "Error resilient video coding using multiple description motion compensation," IEEE Trans Circuit System for Video Technology, Jun. 2002, 12, 438-453.

* cited by examiner

Fig. 6: $d_{max}$ vs. $Q^*$

ON DEMAND PEER-TO-PEER VIDEO STREAMING WITH MULTIPLE DESCRIPTION CODING

§0. RELATED APPLICATIONS

This application is a continuation application of U.S. patent application Ser. No. 11/337,833 filed on Jan. 23, 2006, which claims benefit to U.S. provisional patent application Ser. No. 60/646,080 (referred to as "the '080 provisional"), titled "ON-DEMAND P2P VIDEO STREAMING WITH MULTIPLE DESCRIPTION CODING", filed on Jan. 21, 2005, and listing Shivendra S. Panwar, Keith W. Ross and Yao Wang as the inventors, for any inventions disclosed in the manner provided by 35 U.S.C. §112, ¶ 1. The '080 provisional application is expressly incorporated herein by reference. The scope of the present invention is not limited to any requirements of the specific embodiments described in the '080 provisional application.

§1. BACKGROUND

§1.1 Field of the Invention

The present invention concerns on demand peer-to-peer (P2P) video streaming. More specifically, the present invention concerns improving peer-to-peer based video streaming network to provide reliable and high performance video-on-demand for peer devices that may have common residential network access means.

§1.2 Background Information

Although today most pre-recorded video is distributed by broadcast, cable and satellite television, the present inventors believe that over the next few decades these traditional means of video distribution will be supplanted by Internet video streaming. When this happens, instead of having access to only a few hundred channels, users will be able to search and view, on-demand, enormous libraries of video content stored in the Internet. The present inventors believe that the Internet will not only facilitate the distribution of vast libraries of content, but will also support a wide range of video formats and visual qualities, ranging from high-bit rate DVD quality video to low-bit rate video suitable for hand-held wireless devices.

One of the major challenges in realizing this vision is the deployment of cost-effective Video Streaming Networks (VSNs) in the Internet. Broadly speaking, there are two generic architectures for a VSN: infrastructure-based video distribution; and P2P-based video distribution. An infrastructure-based VSN would deploy a dedicated set of servers to store and distribute content to clients. As with Content Distribution Networks (CDNs) today (such as Akamai), when a user requests a video, the VSN would redirect the client to one or more of its dedicated servers. These servers would then stream the video to the client. Such an infrastructure-based VSN is likely to be prohibitively costly, both in terms of server cost and Internet-connection cost.

The present invention concerns P2P-based VSNs, where users' peers store and stream video to the requesting client peers. Some of these peers might be connected to the Internet via residential access networks such as digital subscriber line (DSL) and cable, while other peers might be connected via high-speed Ethernet connections. The cost of these peers and the Internet access would be borne by the users rather than by VSN infrastructure companies.

Various features of the present invention address numerous issues surrounding the successful deployment of a P2P VSN. Such issues are introduced below.

In P2P systems, nodes may disconnect from the system at anytime without warning. One of the major challenges with a P2P VSN is the distribution of high-quality video without glitches when the distribution devices can disconnect from the Internet without notice. Special care must be taken in designing video source coding schemes that are appropriate for streaming systems in which server nodes can disconnect without warning. Another important challenge relates to the relatively low upstream bandwidth of many of the peers.

A user should only be able to view copyrighted content when authorized to do so.

There are, naturally, a variety of security threats that surround peer-driven content distribution. For example, to earn incentive rewards, server peers can attempt to falsely claim to have streamed requested content. As another example, to avoid making payment, client peers can falsely claim to not have received the content. Server peers, client peers, or third parties can attempt to sabotage the system via traffic-flooding denial of service (DoS) attacks and via content pollution attacks.

Recently, several video multicast systems making use of peer coordination have been studied. However, in these systems, the video content is stored in a central server and the peers merely help to relay the video originating from the server by forming one or several multicast trees. Thus, peers only help each other when they watch the same video.

In view of the foregoing, it would be useful to provide an improved peer-driven VSN.

§2. SUMMARY OF THE INVENTION

In embodiments consistent with the present invention, each video is encoded into multiple descriptions. When a client wants to see a video, the client streams multiple descriptions from other peers, with each description coming from a different peer. As the descriptions arrive to the client, the client combines them and decodes and displays the video. This design has numerous advantages.

Embodiments consistent with the present invention provide efficient high-performance video distribution and video coding for peer-driven VSNs.

Embodiments consistent with the present invention provide a simple optimization procedure for finding the optimal system parameters, including the optimal number of descriptions and the rate of each description. System performance generally improves as the number of descriptions for the videos increases.

§3. BRIEF DESCRIPTION OF THE DRAWINGS

§4. DETAILED DESCRIPTION

The present invention may involve novel methods, apparatus, message formats, and/or data structures for improving P2P-based video streaming networks using multiple-description coding that provides reliable and high performance video on demand. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. Also, as used herein, the article "a" is intended to include one or more items. Where only one item is intended, the term "one" or similar language is used. In the following, "information" may refer to the actual information, or a pointer to, identifier of, or location of such information. No element, act or instruction used in the description should be construed as critical or essential to the present invention unless explicitly described as such. Thus, the present invention is not intended to be limited to the embodiments shown and the inventors regard their invention to include any patentable subject matter described.

§4.1 OVERVIEW

Figure 1:
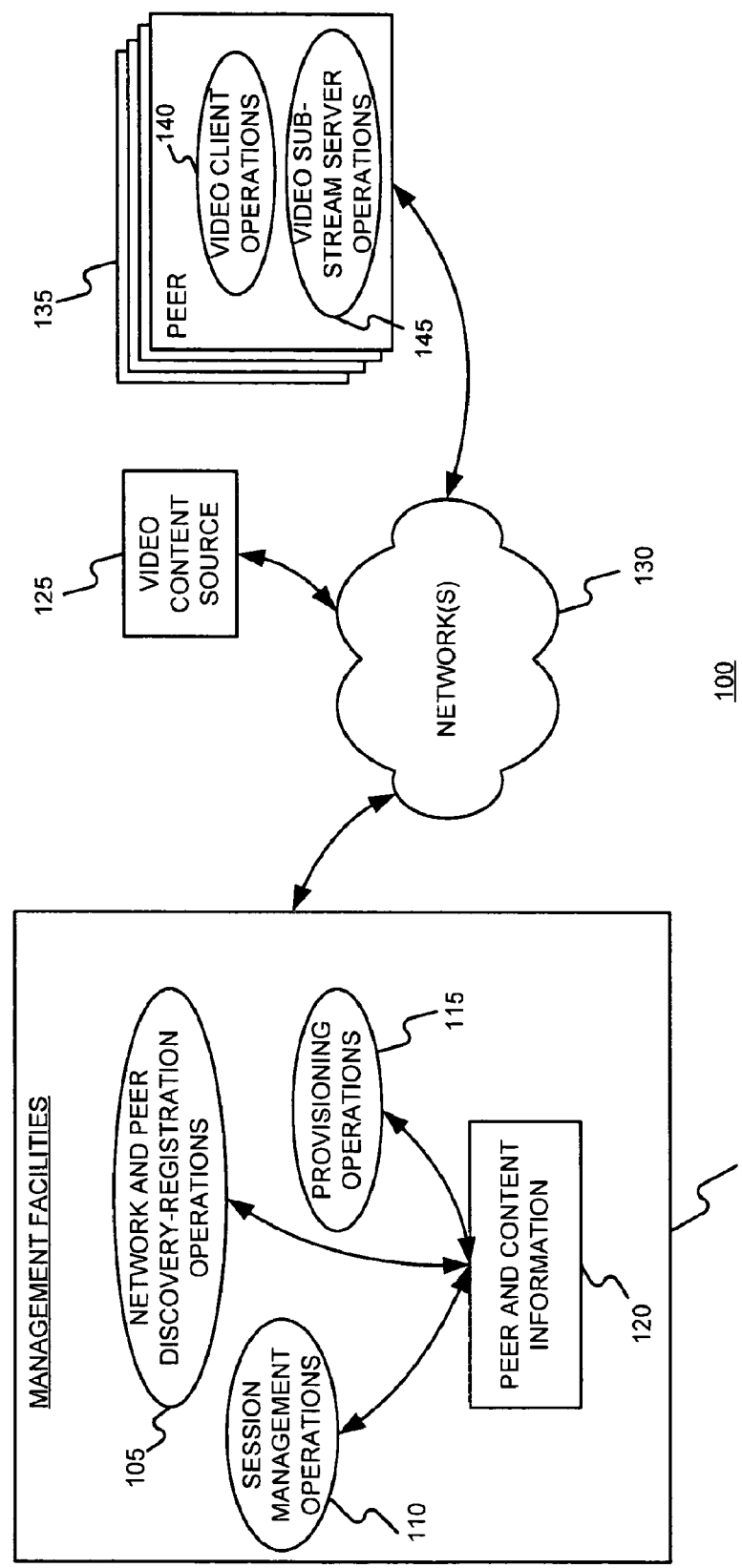
FIG. 1 is a bubble diagram illustrating operations that may be performed in an embodiment consistent with the present invention, as well as information that may be generated and/or used by such operations.

FIG. 1 is a bubble diagram illustrating operations, in an exemplary environment 100, which may be performed in a manner consistent with the present invention, as well as information that may be generated and/or used by such operations. In particular the environment 100 may include management facilities 101, video content source 125, one or more networks 130 (e.g., the Internet), and peers 135. The video content 125 may be a server/database containing large quantities of video content that is available to the management facilities through the network(s) 130 for use in peer-to-peer video streaming. Note that peers 135 may perform one or both of video client operations 140 and video server operations 145. The video client operations 140 may request movie content from video sub-stream servers 145 of other peers 135. Video sub-stream server operations 145 may provide sub-streams to a requesting video client 140 operations of another peer 135. The management facilities 101 may include provisioning operations 115, network and peer discovery-registration operations 105, session management operations 110, and peer and content information 120.

The provisioning operations 115 are responsible for encoding video content into sub-streams and determining server peers 135/145 on which to store video sub-streams based on the availability of server peers 135/145 and an acceptable maximum distortion constraint. The availability of sever peers 135/145 may be obtained or determined from the peer and content information 120.

The network and peer discovery-registration operations 105 are responsible for updating the peer and content information 120 as new peers 135 join or leave the peer-to-peer video streaming network 100, as capabilities of peers change, etc.

The session management operations 110 are responsible for providing the requesting client peers 135/140 with the identification of server peers 135/145 (using the peer and content information 120) that are available for sending video sub-streams corresponding to a requested video. Further, in the event of a server peer 135/145 failure, which would otherwise result in degraded video quality, the session management operations 110 may provide the requesting client peers 135/140 with alternative server peers 135/145 to ensure reliable and high quality video streaming.

The peer and content information 120 may include identification of each of the peers 135, the current status of each of the peers 135 (online/offline/spare capacity/etc.) as well as the video content (sub-streams) stored on a peer 135, etc.

In a peer-to-peer video streaming network consistent with the present invention, each video is encoded into multiple descriptions/sub-streams. Then each description/sub-stream is placed on a different video sub-stream peer server 135/145 (or more generally, different descriptions/sub-streams are placed on different video sub-stream servers 135/145). When a video client 135/140 wants to play a video, multiple peers 135 act as servers 145, each sending a different description/sub-stream of the desired video to the video client peer 135/140. The video client peer 135/140 (e.g., after a short initial delay) combines the received sub-streams, decodes the video, and displays the video as the multiple descriptions/sub-streams are being delivered. When a video sub-stream server peer 135/145 disconnects during a streaming session, the video client peer 135/140 loses the associated description/ sub-stream while the system searches for a replacement server peer 135/145 that stores the same lost video description/sub-stream and that is available to serve it (e.g., has sufficient uplink bandwidth).

Coding a video into multiple descriptions/sub-streams and distributing the descriptions/sub-streams to separate server peers 135/145 has many benefits. First, when a video sub-stream server peer 135/145 is lost, it only causes temporary loss of a single description/sub-stream, which has limited impact on received video quality. Second, each description/sub-stream has a rate much lower than the total rate of the video, thus reducing the required uplink bandwidth at each server peer 135/145. Note that for high-quality video streaming applications, the rate of an entire video may exceed the uplink bandwidth of most video sub-stream server peers 135/145. In such situations, splitting a video across multiple video sub-stream server peers 135/145 not only helps to enhance system reliability, but also circumvents the problem of asymmetric bandwidth at the network access link. Third, streaming from multiple server peers 135/145 helps spread the load of serving the video over the video sub-stream serving peers 135/145. Fourth, from the video publisher's perspective, it is undesirable to store an entire video on any one peer 135. This helps prevent a peer 135 from having illegal and/or unauthorized access to the video (e.g., for purposes of unauthorized playing, copying, and/or distribution). Finally, another side benefit is that the use of multiple lower bandwidth sub-streams typically leads to improved multiplexing gains in the core Internet, thus allowing for an increased loading for a given Quality of Service (QoS) objective.

Figure 2:
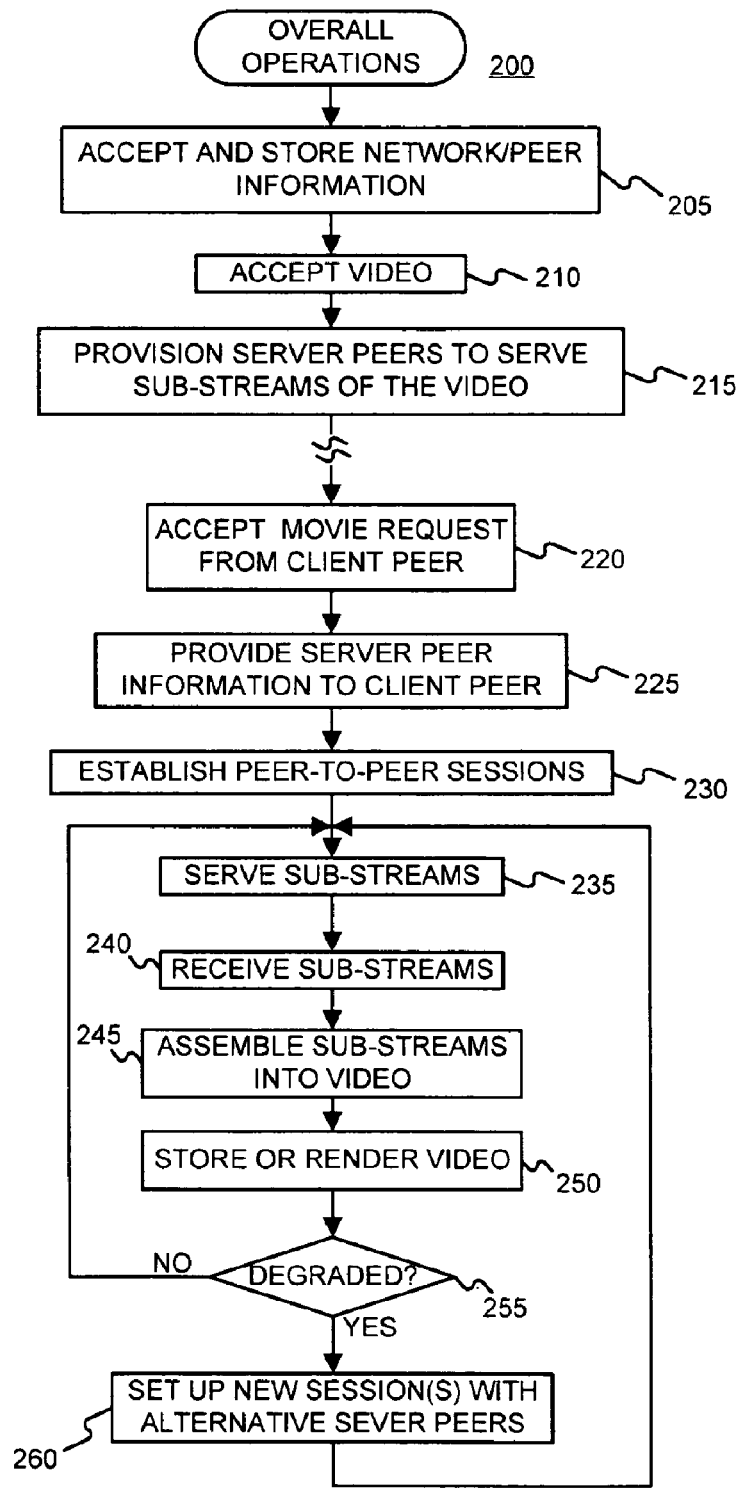
FIG. 2 is a flow diagram illustrating an overall flow of operations in manner consistent with the present invention.

FIG. 2 is a flow diagram illustrating an exemplary method 200 of overall operations consistent to the present invention. In particular, the method 200 may accept and store network and peer information, as well as video content. (Blocks 205 and 210) Next, the method 200 may provision server peers to serve sub-streams of the video. (Block 215) At this point, the system is provisioned and ready to serve videos as sub-streams.

Upon accepting a movie request from a client peer, the method 200 may provide the client peer with server peer information and establish peer-to-peer sessions. (Blocks 220, 225, and 230) Subsequently, the sub-streams are served from the server peers to the client peer, where the received sub-streams are assembled into video. (Blocks 235, 240, and 245) The assembled video is then stored or rendered at the client peer. (Block 250) If the video is degraded, the method 200 may set up new session(s) with alternative sever peers (Block 260) before branching back to block 235.

Thus, in peer-to-peer video server network systems consistent with the present invention, client devices request videos for immediate viewing. After a client makes a request (e.g., pursuant to a command), the system attempts to set up a session, which includes multiple descriptions sent from different server nodes to the user's client device. From a user's perspective, there are two important performance measures—acceptance probability and video quality. Acceptance probability is the likelihood the system will locate the necessary descriptions and establish a session. Video quality is the visual (and/or audio) quality of the session, from start to finish.

Because each admitted session consumes peer upstream bandwidth resources, and because peers are intermittently connecting, as more sessions are admitted into the system, it becomes increasingly difficult to provide each on-going session with sufficient descriptions for adequate visual quality. Furthermore, once a server's upstream connection (pipe) becomes full, new session requests no longer have access to any of the video sub-streams stored at that particular server.

Embodiments consistent with the present invention consider these simple observations in a high-level design goal— namely to design, in an integrated fashion, the components of the system (e.g., the coding, sub-stream placement, admission control, sub-stream assignment and delivery mechanism) to maximize the acceptance probability subject to the constraint that each on-going video session meets a target video quality constraint.

For the foreseeable future, for peer users, the end-to-end bandwidth bottleneck will be in residential access and not in the Internet core. Furthermore, in most broadband residential connections today (including cable modem and ADSL), the upstream rate is significantly less than the downstream rate. Thus, it is not unreasonable to assume that the bandwidth bottleneck between server and client is the server's upstream rate.

§4.2 EXEMPLARY METHODS

Figure 3:
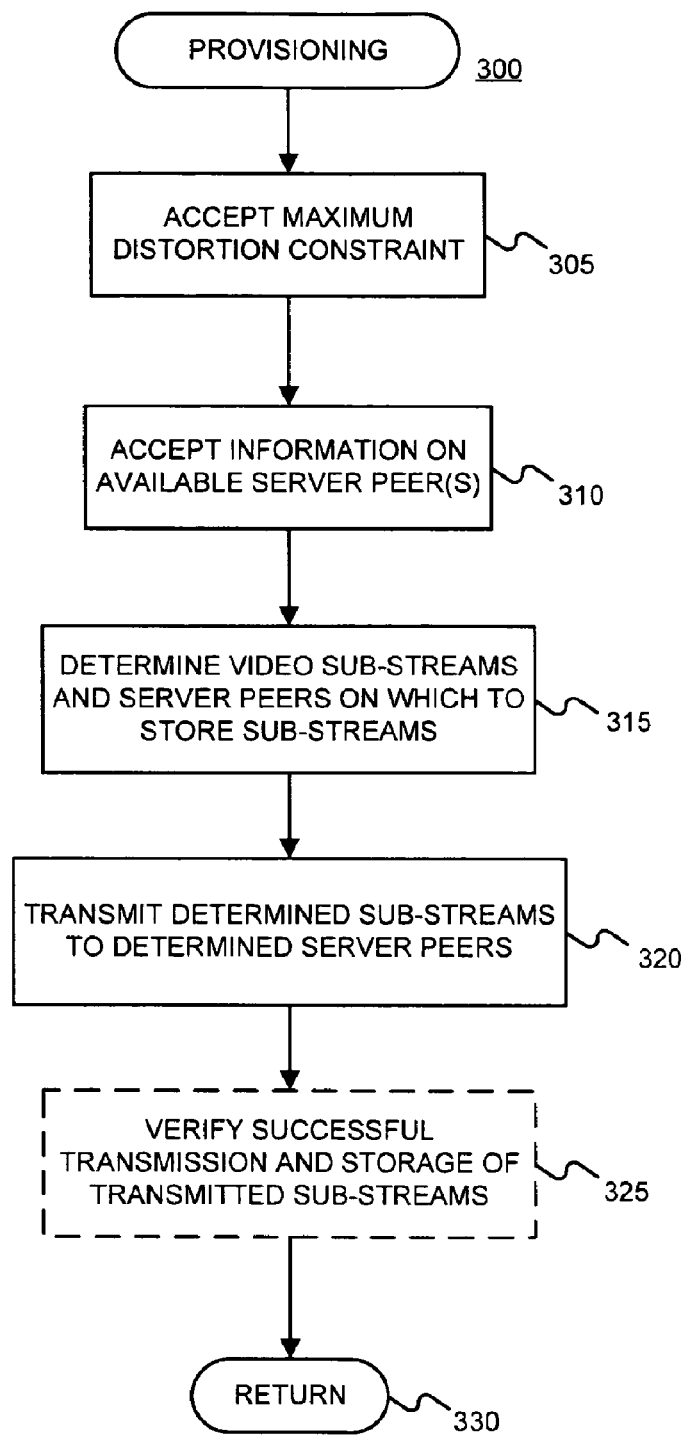
FIG. 3 is a flow diagram illustrating an exemplary method for provisioning a P2P system to serve a video in a manner consistent with the present invention.

FIG. 3 is a flow diagram illustrating an exemplary method 300 of performing provisioning operations (Recall 115 of FIG. 1.) in a manner consistent with the present invention. Specifically, the method 300 may accept a maximum distortion constraint as well as information on available sever peer(s). (Blocks 305 and 310) Subsequently, the method 300 may determine video sub-streams and server peers on which to store sub-streams. (Block 315) The determined sub-streams are then transmitted by the method 300 to the determined server peers. (Block 320) The method 300 might also verify the successful transmission and storage of transmitted sub-streams. (Block 325).

Referring back to block 305, the maximum distortion constraint is the distortion between the original video quality and the reconstructed video by a client peer. The maximum distortion constraint can be considered as a measure of a target video quality.

Referring back to block 315, the maximum distortion constraint and the availability of sever peers may be used in order to determine an optimal number of video sub-streams such that the maximum distortion constraint is not exceeded thus, ensuring high quality video streaming within a network. Exemplary techniques for performing these acts are described in §4.4 below.

Figure 4:
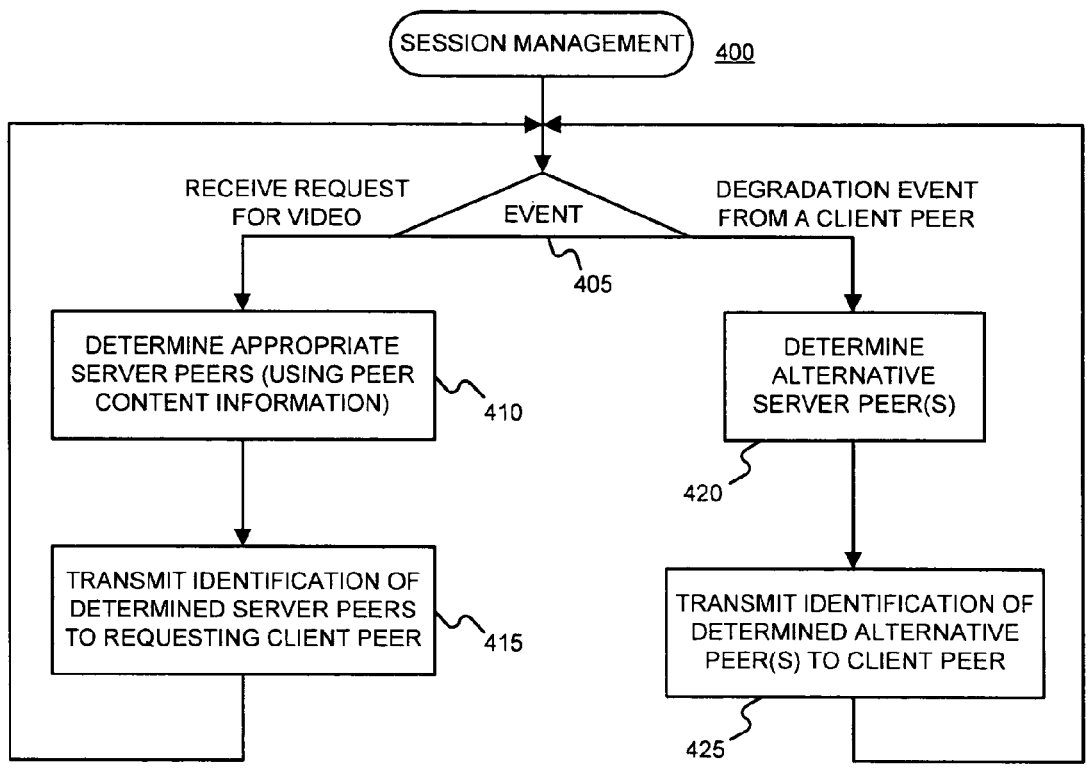
FIG. 4 is a flow diagram illustrating an exemplary method of managing sessions in manner consistent to the present invention.

FIG. 4 is a flow diagram illustrating an exemplary method 400 for performing session management operations (Recall 110 of FIG. 1.) in manner consistent with the present invention. The session management method 400 may provide video requesting client peers with information on server peers. Specifically, when a video request is received, the method 400 may determine appropriate server peers (e.g., using peer and content information 120) and transmit identification of the determined server peers to the requesting client peer. (Blocks 405, 410, and 415) In the event that the method 400 is informed of a video degradation occurring at a client peer receiving streaming video content, the method 400 may determine one (or more) alternative server peer(s) and transmit identification of determined alternative server peer(s) to client peer. (Blocks 405, 420, and 425)

Referring back to block 410, the method 400 may utilize the peer and content information 120 in order to determine appropriate server peers. That is, this determination may need to know on which server peers the sub-streams of the requested video are stored, as well as information concerning the connectivity of the server peers (offline/online) and their available upload bandwidth (capacity).

Referring back to blocks 420 and 425, the method 400 can also provide the requesting client with one (or more) alternative sever peer(s) in the event a video degradation occurs due to a server failure for instance. Thus the method 400 helps ensure video quality of expected standards within a video streaming network.

Figure 5:
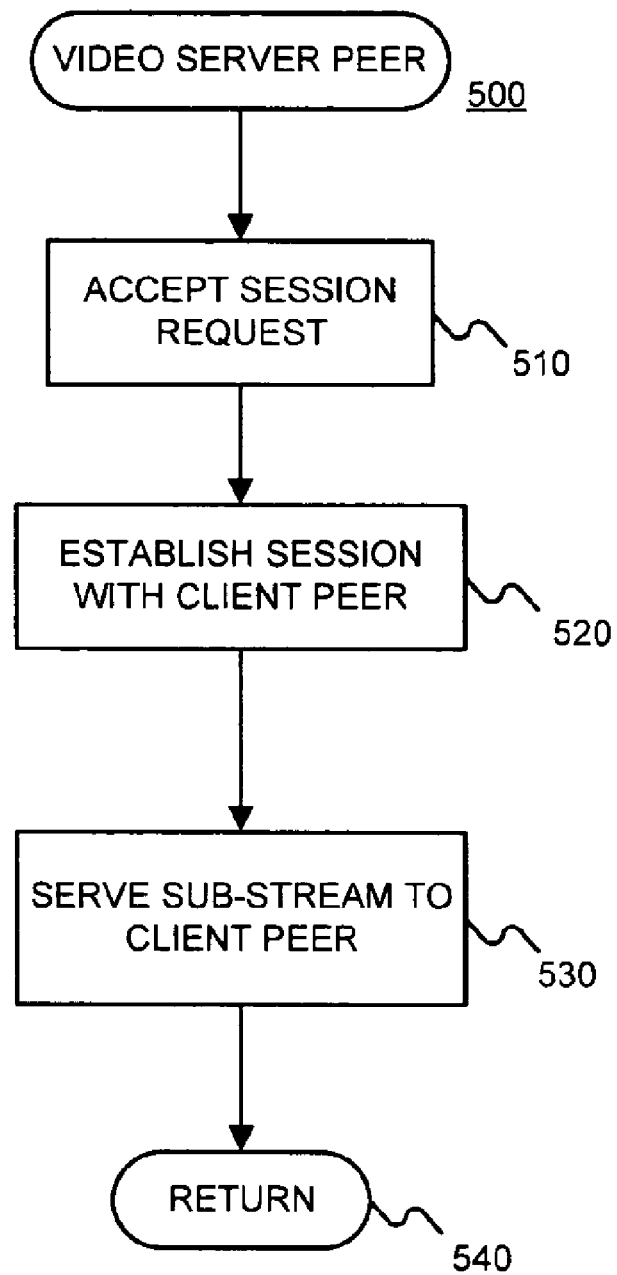
FIG. 5 is a flow diagram illustrating an exemplary method of performing video server peer operations in a manner consistent with the present invention.

FIG. 5 is a flow diagram illustrating an exemplary method 500 for performing video server peer operations (Recall 145 of FIG. 1.) in a manner consistent with the present invention. In particular, the video sever peer may accept a session request from a client peer (directly or via some other node) and establish a session with the client peer. (Blocks 510 and 520) Next, the sub-stream is then served to the client peer (Block 530) before the method 400 is left.

Figure 6:
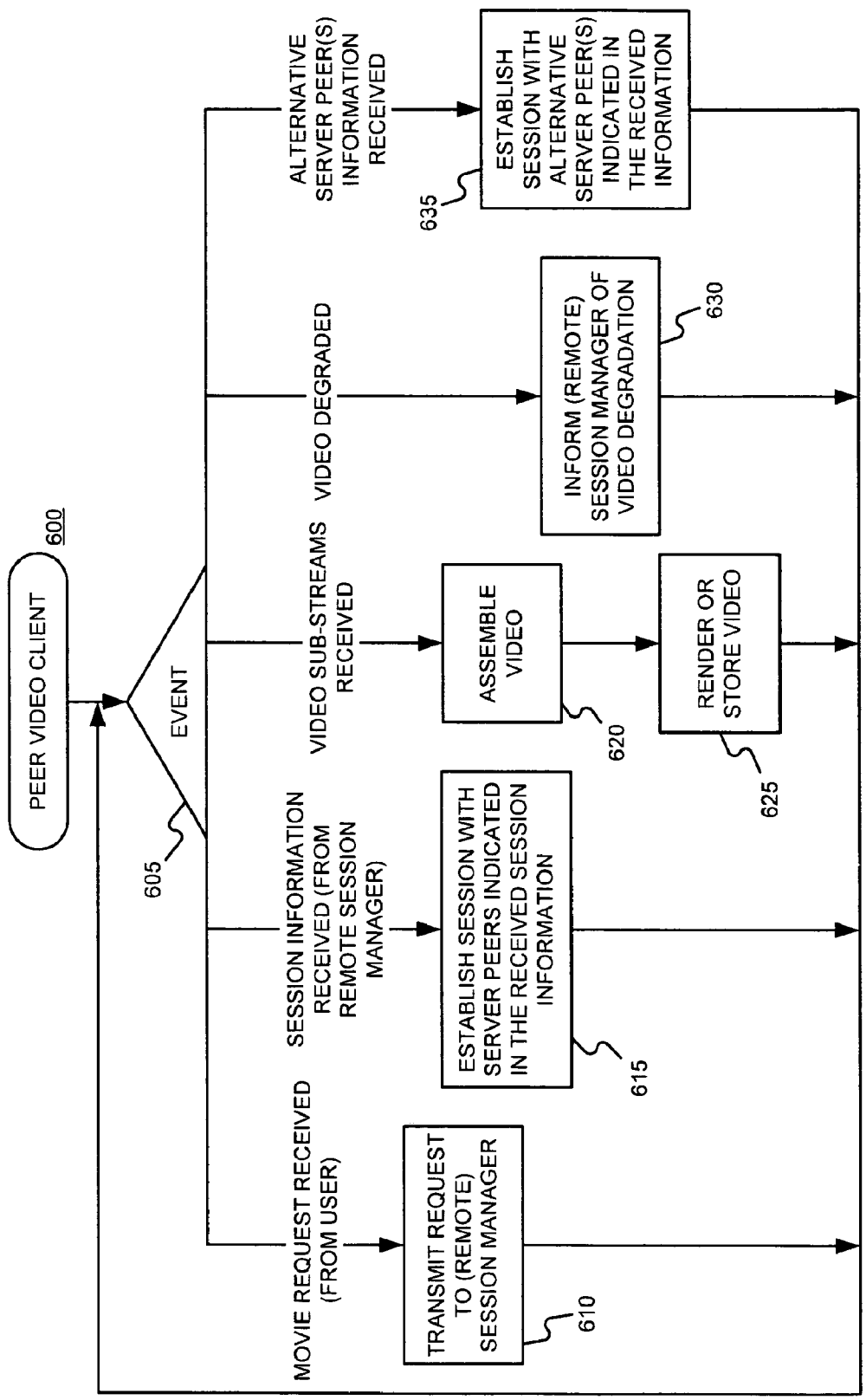
FIG. 6 is a flow diagram illustrating an exemplary method of performing video client peer operations in a manner consistent with the present invention.

FIG. 6 is a flow diagram illustrating an exemplary method 600 for performing peer video client operations (Recall 135 of FIG. 1.) in a manner consistent with the present invention. Specifically, the method 600 may follow various operations depending on different events that may occur. (Block 605) If a movie request is received (from user), the method 600 may transmit a request to the (remote) session manager (Recall FIG. 4 and 110 of FIG. 1.). (Block 610) If session information is received (from the (remote) session manager), the method 600 may establish a session with server peers indicated in the received session information (Recall FIG. 5 and multiple instances of 145 of FIG. 1.). (Block 615) If video sub-streams are received, the method 600 may assemble the video from the received sub-streams and render or store the assembled video. (Blocks 620 and 625) If the video is degraded, the method 600 may inform the (remote) session manager of video degradation. (Block 630) If alternative server peer(s) information is received, the method 600 may establish a session with alternative session peer(s) indicated in the received information. (Block 635)

As can be appreciated from blocks 630 and 635, the method 600 is able to inform the session manager of a degraded video quality. Once the session manager provides the client with one (or more) alternative server(s), the client can establish new sessions with alternative server peer(s) indicated by the session manager. Therefore, expected video quality may be maintained within the system.

§4.3 EXEMPLARY APPARATUS CONSISTENT WITH THE PRESENT INVENTION

Figure 7:
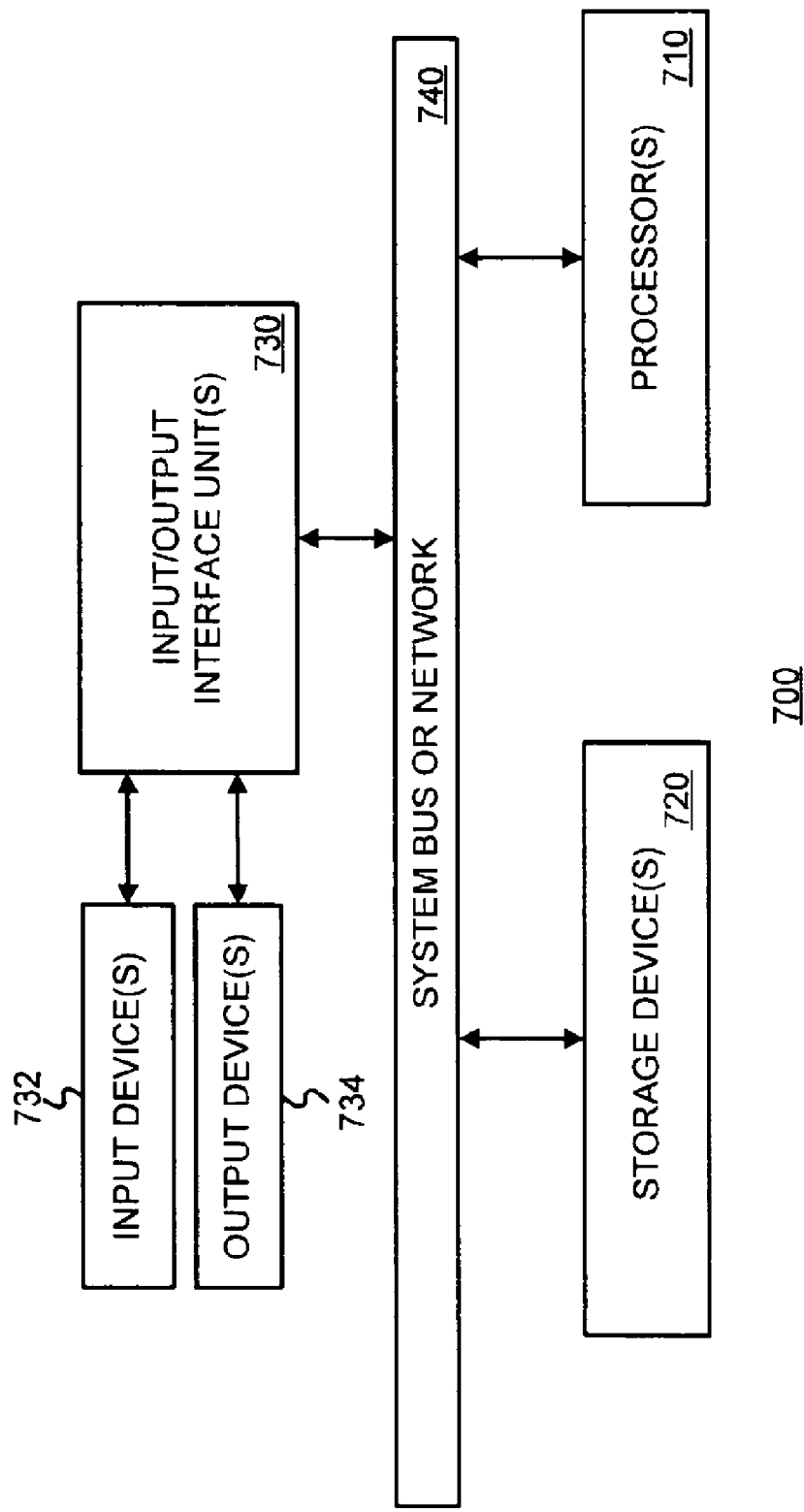
FIG. 7 is a block diagram of apparatus that may be used to perform at least some operations and store at least some information in a manner consistent with the present invention

FIG. 7 is a high-level block diagram of apparatus that may be used to perform at least some operations and store at least some information consistent with the present invention. The machine 700 basically includes a processor(s) 710, an input/output interface unit(s) 730, a storage device(s) 720, and a system bus or network 740 for facilitating the communication of information among the coupled elements. An input device(s) 732 and an output device(s) 734 may be coupled with the input/output interface(s) 730.

The processor(s) 710 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to perform one or more aspects of the present invention. At least a portion of the machine executable instructions may be stored (temporarily or more permanently) on the storage device(s) 720 and/or may be received from an external source via an input interface unit 730.

In one embodiment, the machine 700 may be one or more conventional personal computers. In this case, the processing unit(s) 710 may be one or more microprocessors. The bus 740 may include a system bus. The storage devices 720 may include system memory, such as read only memory (ROM) and/or random access memory (RAM). The storage device(s) 720 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 732, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 710 through an appropriate interface 730 coupled to the system bus 740. The output device(s) 734 may include a monitor or other type of display device, which may also be connected to the system bus 740 via an appropriate interface. In addition to (or instead of) the monitor, the personal computer may include other (peripheral) output devices (not shown), such as speakers and printers for example.

One or more of the video content source 125, management facilities 101, and peers 135 may be one or more machines 700.

Various aspects of the present invention may be implemented using hardware (e.g., integrated circuits, ASICS, etc.) and/or software (e.g., processor executed program instructions, which may be stored on a tangible storage medium and/or received from an external source). The peer devices may include, for example, one or more of personal computers (desktop, laptop, etc.), personal digital assistants, mobile telephones, mobile devices, etc. Information may be communicated using one or more of various means (e.g., wired, optical, wireless) and various protocols.

§4.4 REFINEMENTS AND ALTERNATIVES

Figure 8:
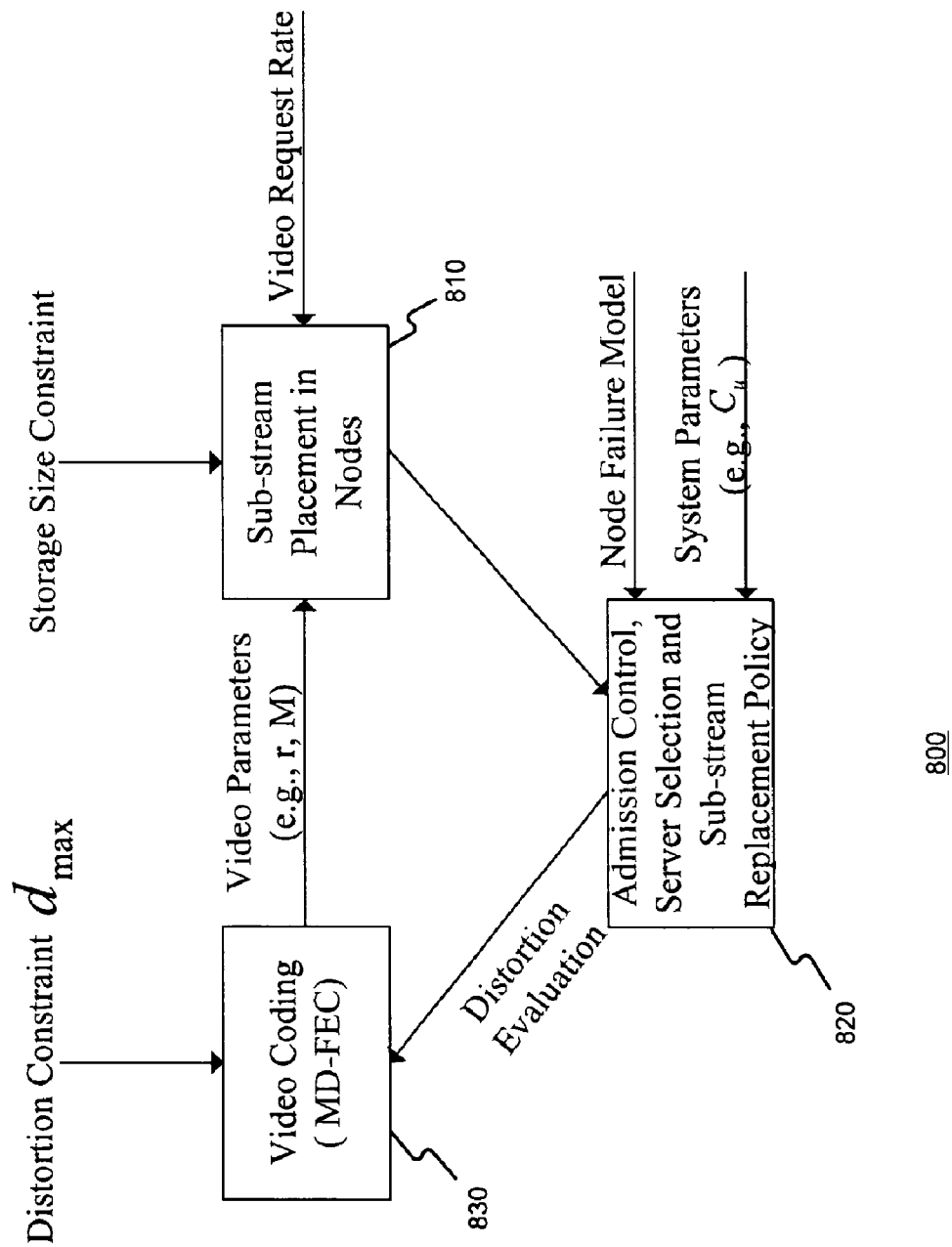
FIG. 8 is a block diagram illustrating an overview of interactions of the system components in a manner consistent with the present invention.

FIG. 8 is a block diagram illustrating an overview of interactions of the system components in a manner consistent with the present invention. Specifically, the exemplary system may include components for video coding (MD-FEC) 830, sub-stream placement in nodes 810, and admission control, server selection and sub-stream replacement policy 820. The video coding (MD-FEC) 830 is responsible for encoding a video into multiple descriptions/sub-streams and may accept a maximum distortion constraint as well as distortion evaluation results from the admission control, server selection and sub-stream replacement policy 820. As a result, the video coding 830 may output the optimal video parameters (e.g., bit rate of each description r, number of descriptions M). The sub-stream placement in nodes 810, may accept video parameters from the video coding 830 as well as storage size constraints and a video request rate. The sub-stream placement in nodes 810 information is then forwarded to the admission control, server selection and sub-stream replacement policy 820. The admission control, server selection and sub-stream replacement policy 820 is responsible for establishing sessions within the network as well as admitting new peers and determining alternative peers in case of a peer failure. It 820 may also accept other information such as a node failure model and system parameters (e.g., number of peers in the system, peer uplink bandwidth, etc.). As a result a distortion evaluation of the system may be performed and the video coding 830 may be informed of such a distortion evaluation.

§4.4.1 MD-FEC Video Coding

Multiple description (MD) video coding has become an active research area only in the past few years. Although various coders have been proposed (See, e.g., Y. Wang, R. Reibman, and S. Lin, "Multiple description coding for video communications," *Proc. IEEE Special issue on recent advances in video coding and delivery*, A. Reibman, H. Jafarkhani, Y. Wang, and M. Orchard, "Multiple Description Coding for Video using Motion Compensated Prediction," *IEEE Trans. Circuit and System for Video Technology*, pp. 193-204 (March 2002); and Y. Wang and S. Lin, "Error resilient video coding using multiple description motion compensation," *IEEE Trans. Circuit and System for Video Technology*, vol. 12, pp. 438-453 (June 2002), all incorporated herein by reference), most coders generate a fairly small number of descriptions, with M=2 being the most common case. On the other hand, to fully explore the load balancing and error-resilience benefit from employing multiple peer-servers, a larger M is desired.

Instead of designing the source encoder to yield multiple descriptions directly, one can apply unequal forward error coding (FEC) to different parts of a scalable bitstream, commonly known as MD-FEC. (See, e.g., A. Albanese, J. Blomer, J. Edmonds, M. Luby, and M. Sudan, "Priority encoding transmission," *IEEE Trans. Inform. Theory*, pp. 1737-1744 (Nov. 1996); and G. Davis and J. Danskin, "Joint source and channel coding for image transmission over lossy packet networks," *Proc. SPIE Conf. Wavelet Applications to Digital Image Processing*, (Denver, Colo., August 1996), both incorporated herein by reference.)

Figure 9:
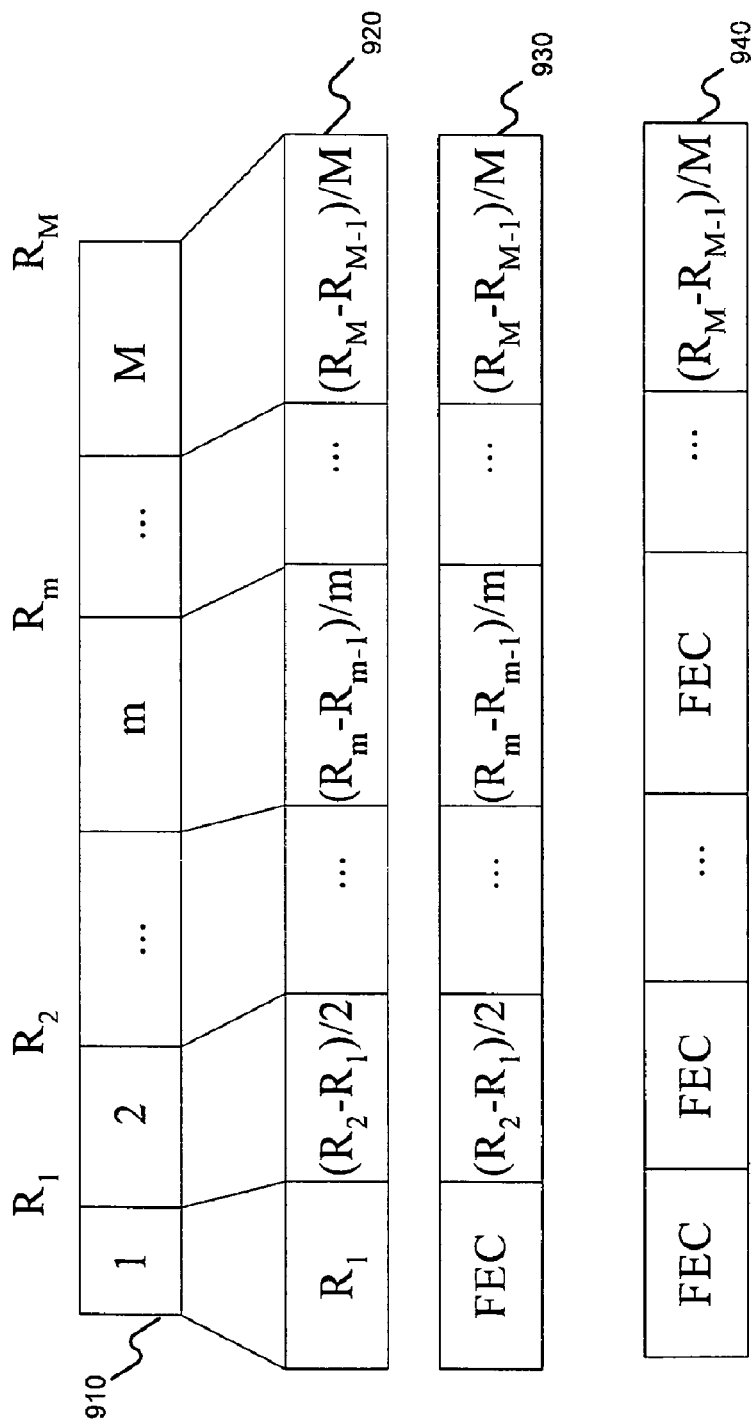
FIG. 9 illustrates a video bit stream partitioned into sub-streams according to a multiple description-forward error correction (MD-FEC) video coding technique consistent with the present invention.

FIG. 9 illustrates a video bit stream partitioned into sub-streams according to MD-FEC video coding in a manner consistent with the present invention. As shown in FIG. 9, the original bitstream from each group of frames (GoF) is partitioned into M layers, with layer k allocated $R_k$ bits. For k=1, ..., M, the $k^{th}$ layer is further divided into k equal-length groups. An (M, k) Reed-Solomon (RS) code is then applied to k groups to yield M groups. Description m is formed by packing bits from group m from all layers. At the receiver, if K descriptions are received, the decoder can recover the first K layers of the original bitstream. The rate and receiver distortion is controlled by varying the layer partition ($R_1$, $R_2$, ..., $R_M$). It is also worth noting that in FIG. 9, a stronger FEC is applied on the more important bits (on the left bits) 910, while weaker FEC is, applied on the less important bits (on the right bits). This is because the left-hand side comprises the most important bits for video rendering.

In the following specification, M denotes the number of descriptions and r denotes the bit rate of each description. Thus, the total rate of a video with all descriptions is R=Mr. We now consider the challenge of optimally determining the layer partition ($R_1$, $R_2$, ..., $R_M$) for a given M and r. To this end, suppose that the client is receiving the M descriptions from M different server nodes, and suppose that these server nodes can fail or disconnect from the network. Let $P_m$ denote the probability of receiving m out of M descriptions, and let P denote the probability mass function $P_m$, m=0, ..., M. (As discussed below, the vector P depends on statistics governing the peer disconnects as well as the time to find replacement peers.) Let $D_m(R_1, R_2, ..., R_M)$, m=0, ..., M, denote the distortion when m descriptions are received for layer partition ($R_1, R_2, ..., R_M$). Then the expected distortion of the received video is:

$$D(R_1, \ldots, R_M) = \sum_{m=0}^{M} P_m D_m(R_1, \ldots, R_M) \qquad (1)$$

Because the MD-FEC coder with an arbitrary M can be obtained from any scalable coder and rate-distortion optimized layer partition based on a given P, the MD-FEC coder may be used to evaluate the effect of M and r on the overall system performance.

Using the above notation, the MD-FEC optimization problem can be formulated for given M, r, and P as follows: determine the optimal layer partition ($R_1$, $R_2$, ..., $R_M$) for:

$$\min D(R_1, \ldots, R_m) \qquad (2)$$

$$\text{s.t.} \sum_{m=1}^{M} \alpha_m R_m = Mr$$

where $$\alpha_m = \frac{M}{m(m+1)}, m = 1, \ldots, M-1$$

and $$\alpha_M = 1$$

Let D(M, r, P) denote the optimal value of this optimization problem. This is a non-linear optimal resource allocation problem. Fast algorithms for solving this optimization problem have been presented. (See, e.g., Puri and K. Ramchandran, "Multiple description source coding through forward error correction codes," $33^{rd}$ *Asilomar Conf. Signals, Systems and Computers*, (October 1999); A. E. Mohr, R. E. Ladner, and E. A. Riskin, "Approximately optimal assignment for unequal loss protection," *Proc. IEEE Int. Conf. Image Processing*, (Vancouver, BC, September 2000); and V. Stankovic, R. Hamzaoui, and Z. Xiong, "Packet loss protection of embedded data with fast local search," *Proc. IEEE Int. Conf. Image Processing*, (Rochester, N.Y., September 2002), all incorporated herein by reference.) Assume that the multiple descriptions are created with MD-FEC, and that the partition ($R_1, R_2, ..., R_M$) for a given M, r, and P is obtained by solving the optimization problem (2).

§4.4.2 Maximizing the Number of Sessions

The system design objective introduced above is now expressed in a more quantitative way and the solution for a simplified system model is now presented. In the specification, video quality will be measured in terms of the distortion between the original video and the reconstructed video by the client, and the target quality will be translated into a target distortion $d_{max}$. Let Q denote the number of ongoing video sessions (with each session consisting of a multiple sub-streams). With the same notation as above, let D(M, r, P) denote the optimal expected distortion for a given number of descriptions M, description rate r, and probability mass function P. This probability in general depends on the rate r, the number of on-going sessions Q and the video placement over peers, collectively denoted by φ. To make this dependency explicit, the notation P(m, M; r, Q, φ) is used instead of $P_m$ and D(M, r, Q, φ) is written for D(M, r, P). Recall that an overall design criterion might be to maximize the number of sessions subject to the constraint that each on-going video session meets the target quality constraint. This criterion can now be restated as:

$$\max Q \quad (3)$$

$$\text{s.t. } D(M, r, Q, \phi) \leq d_{max}$$

The challenge in solving this problem lies in the fact that the distortion is affected by the video encoding parameters M, r and video sub-stream placements. To shed some insight on this complex problem, a simplified and idealized model is first formulated and solved. After gaining some insights from this simplified problem and its solution, we will then return to the original problem.

Consider a homogeneous system with N peers, each with $C_u$ bps of uplink bandwidth. Each peer is connected with probability p and peer connectivity is independent from peer to peer. Each peer can simultaneously send $S=C_u/r$ descriptions (for this illustrative analysis, the integer constraint is ignored). In this simplified model, the storage limitation at the peers is ignored and it is assumed that all descriptions of all videos are stored in every node. Therefore $\phi$ may be removed from P(m, M; r, Q, $\phi$) and D(M, r, Q, $\phi$) in this section. With these simplifications, the problem (3) becomes choosing M and r to maximize Q while meeting the distortion constraint $D(M, r<Q) \leq d_{max}$. To solve this problem, the average distortion D(M, r, Q) for a given M, r, and Q is determined. To this end, P(m, M; r, Q) is first calculated. Then, the optimization problem (2) is applied to get the optimal average distortion D(M, r, Q).

Now P(m, M; r, Q) is calculated. Let X be a random variable denoting the total number of peers in the network that are up at any time; X is binomial with parameters N and p. The total number of descriptions that the system can send at any time is XS. For a given X, the number of descriptions that can be sent to each session is m=XS/Q, with m ranging from 0 to $m_{max}$=NS/Q. In other words, m descriptions are available to each of the Q sessions when the number of connected peers is X=k=Qm/S with $S=C_u/r$. This occurs with probability $$P(X = k) = \binom{N}{k} p^k (1-p)^{N-k}, k = 0, \ldots, N$$

The number of descriptions available to any one session is at most M. When m<M, use all the available servers must be used to send m descriptions to each client. When m≧M, only M descriptions need be sent to each client by selecting M out of possible m servers. Therefore, the probability of having m out of M descriptions available for a client is $$P(m, M; r, Q) = \begin{cases} P(X = Qm/S), m = 0, 1, \ldots, M-1 \\ \sum_{l=M}^{NS/Q} P(X = Ql/S), m = M \end{cases} \quad (4)$$

In summary, under the assumptions of this subsection, for each given M, r, and Q whether a given parameter triple (M, r, Q) is feasible can be determined as follows:
1) Calculate P(m, M; r, Q), m=1, ..., M, using (4).
2) From P(m; M; r, Q), m=1, ..., M, calculate the optimal MD-FEC partition $(R_1, R_2, \ldots, R_M)$ and the corresponding average distortion D(M, r, Q) from the sub-optimization problem (2).
3) If $D(M, r, Q) \leq d_{max}$, then the triple (M, r, Q) is feasible.

To find the maximum number of sessions, one can search over all triples (M, r, Q) to find the feasible triple with the largest value of Q. However, since the number of such triples is very large, we now show that it is optimal to set $M=M_{max}$, where $M_{max}$ is the largest number of descriptions permitted.

§4.4.3 Optimum Value of M

Define Q*(M, r) as the maximum number of sessions that the network can support to meet the distortion criterion $d_{max}$ given the video parameters (M, r).

Theorem: For any given r, Q*(M, r) is non-decreasing with M.

Proof: Fix r and M. Let $Q^*_1:=Q^*(M, r)$ and $Q^*_2:=Q^*(M+1, r)$. It suffices to show that $Q^*_2 \geq Q^*_1$.

Figure 10:
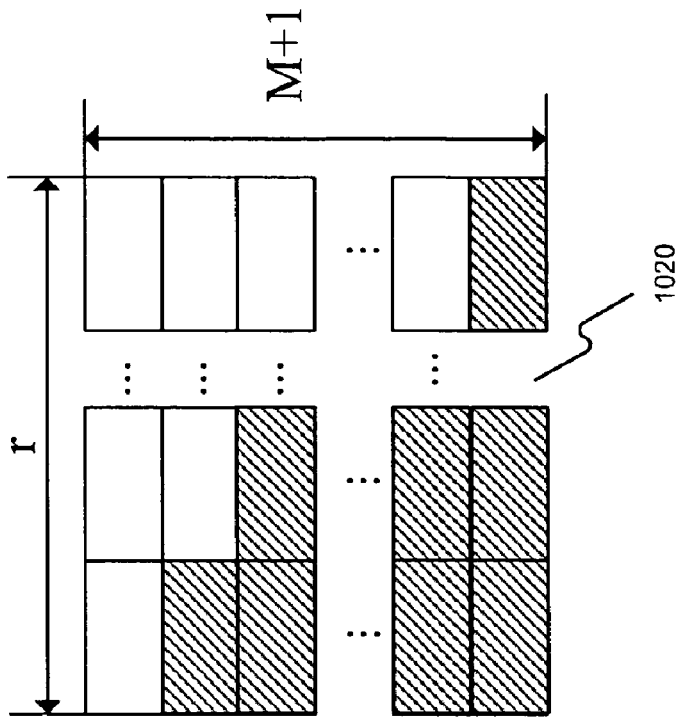
FIG. 10 illustrates an optimum MD-FEC structure (bit allocation) consistent with the present invention.
Figure 10:
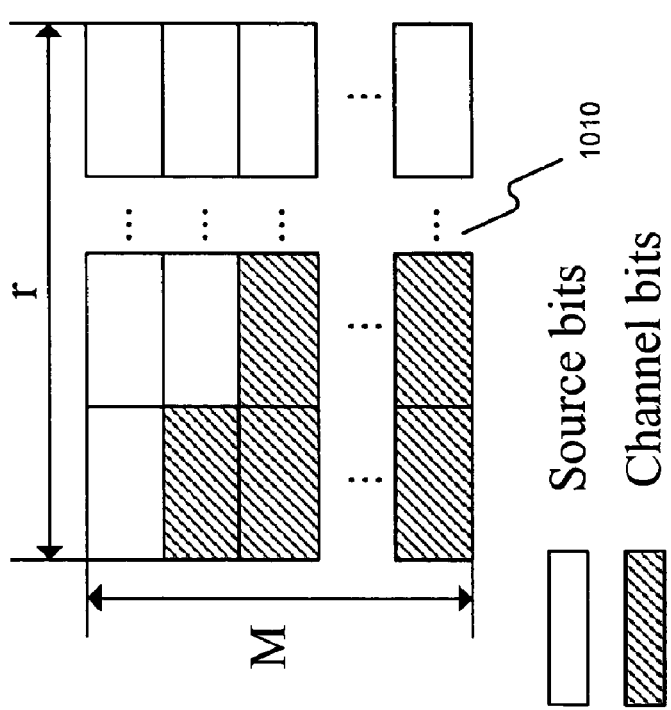

We first prove that the optimized average distortion D(M, r, $Q^*_1$) is greater than or equal to the optimized average distortion D(M+1, r, $Q^*_1$). For M descriptions, the optimal MD-FEC structure 1010 is given in FIG. 10. Each row corresponds to one description. The white rectangles represent the amount of source bits. The hatched rectangles represent the amount of channel bits. An MD-FEC structure 1020 is constructed for M+1 descriptions in FIG. 10 as follows:

1) The first M rows in 1010 are copied to the first M rows in 1020; and
2) The last row in 1020 is filled with channel bits only.

Based on this construction, the distortion of receiving m descriptions out of M in 1010 is equal to the distortion of receiving m descriptions out of M+1 in 1020 for m≦M. Let $\tilde{D}(m, M+1, r)$ denote the distortion when receiving m descriptions for this construction (which is not optimized). Thus, we have $$\tilde{D}(m, M+1, r) = D(m, M, r), m = 1, \ldots, M \quad (5)$$

Also, from 1020, we have $$\tilde{D}(M+1, M+1, r) = \tilde{D}(M, M+1, r) \quad (6)$$

The probability in equation (4) implies:

$$\begin{cases} P(m, M; r, Q^*_1) = P(m, M+1; r, Q^*_1), m = 0, 1, \ldots, M-1 \\ P(M, M; r, Q^*_1) = P(M, M+1; r, Q^*_1) + P(M+1, M+1; r, Q^*_1) \end{cases} \quad (7)$$

The average distortion for M+1 descriptions is $$\tilde{D}(M+1, r, Q^*_1) = \sum_{m=1}^{M+1} P(m, M+1; r, Q^*_1) \tilde{D}(m, M+1, r)$$

$$= \sum_{m=1}^{M-1} P(m, M+1; r, Q^*_1) \tilde{D}(m, M+1, r) +$$

$$\left[ \begin{array}{c} P(M, M+1; r, Q^*_1) + \\ P(M+1, M+1; r, Q^*_1) \end{array} \right] \cdot \tilde{D}(M, M+1, r)$$

$$= \sum_{m=1}^{M-1} P(m, M; r, Q^*_1) D(m, M, r) +$$

$$P(M, M; r, Q^*_1) D(M, M, r)$$

$$= \sum_{m=1}^{M} P(m, M; r, Q^*_1) D(m, M, r)$$

$$= D(M, M, r, Q^*_1)$$

Therefore, the optimized average distortion for M descriptions is equal to the average distortion for M+1 descriptions using the above construction.

The optimal design of MD-FEC for M+1 descriptions has an average distortion no greater than the design just constructed for M+1. Therefore, $$D(M+1,r,Q^*_1) \leq D(M,r,Q^*_1) \leq d_{max} \qquad (8)$$

Finally, by definition of $Q^*_2$ we have $$D(M+1,r,Q) \leq d_{max} \text{ iff } Q \leq Q^*_2 \qquad (9)$$

Thus, from (8) and (9), we have $Q^*_1 \leq Q^*_2$.

It follows from the theorem that we can use the highest possible value of M. In a real network, since M descriptions are streamed from different nodes, the total number of descriptions should be less than the total number of nodes in the network. Furthermore, as M becomes larger, more connections for each streaming session need to be established. This consumes more network and node computation resources. Therefore, within system constraints, there is a practical upper limit on M.

§4.4.4 Average Distortion Analysis for Gaussian Source

In this subsection, we consider a theoretical rate-distortion (R-D) model, namely, the Gaussian source model:

$$D_m(R_1, \ldots, R_M) = D(R_m) = \sigma^2 \cdot 2^{-2R_m} \qquad (10)$$

For simplicity, let $P_m$ denote $P(m, M; r, Q)$. Then the average distortion of a Gaussian source is:

$$D_m(R_1, \ldots, R_M) = \sum_{m=0}^{M} P_m \sigma^2 \cdot 2^{-2R_m} \qquad (11)$$

$$= P_0 \sigma^2 + \sum_{m=1}^{M} P_m \sigma^2 \cdot 2^{-2R_m}$$

Recall the MD-FEC optimization problem in equation (2). The optimal solution can be found using the theory of Lagrange Multipliers. Introducing the Lagrange multiplier $\lambda$, we obtain $$L(R_1, \ldots, R_M, \lambda) = P_0 \sigma^2 + \sum_{m=1}^{M} P_m D(R_m) + \lambda \left( \sum_{m=1}^{M} \alpha_m R_m - Mr \right) \qquad (12)$$

At optimality, the partial derivatives of the Lagrangian function with respect to $R_m$, m=1, ..., M, and $\lambda$ equal zero. This yields the optimal bit allocation:

$$\frac{P_m}{\alpha_m} \frac{dD(R_m)}{dR_m} + \lambda = 0 \qquad (13)$$

where $$\alpha_m = \frac{M}{m(m+1)}, m = 1, \ldots, M-1,$$

and $$\alpha_M = 1$$

Substituting (10) in (13), we can explicitly determine the optimal values for MD-FEC partition:

$$R_m = -\log_2\left(\frac{\lambda \beta_m}{c}\right)/2 \qquad (14)$$

where $$\lambda = \left[ \frac{2^{-2Mr}}{\prod_{m=1}^{M} \left(\frac{\beta_m}{c}\right)^{\alpha_m}} \right]^{\frac{1}{\sum_{m=1}^{M} \alpha_m}}$$

and $$\beta_m = \alpha_m / P_m, c = 2\sigma^2 \ln 2.$$

Based on (14), we can get an explicit expression for (10), then calculate the average distortion as follows:

$$D(M, r, Q) = \sigma^2 \left[ P_0 + \frac{\lambda}{c} \sum_{m=1}^{M} \frac{M}{m(m+1)} \right] \qquad (15)$$

From (15), the average distortion can be calculated for a given (Q, r, M). From the theorem, Q* is a non-decreasing function with M. Thus, the optimal solution of Q can be determined by a one dimensional numerical search for r.

Figure 11:
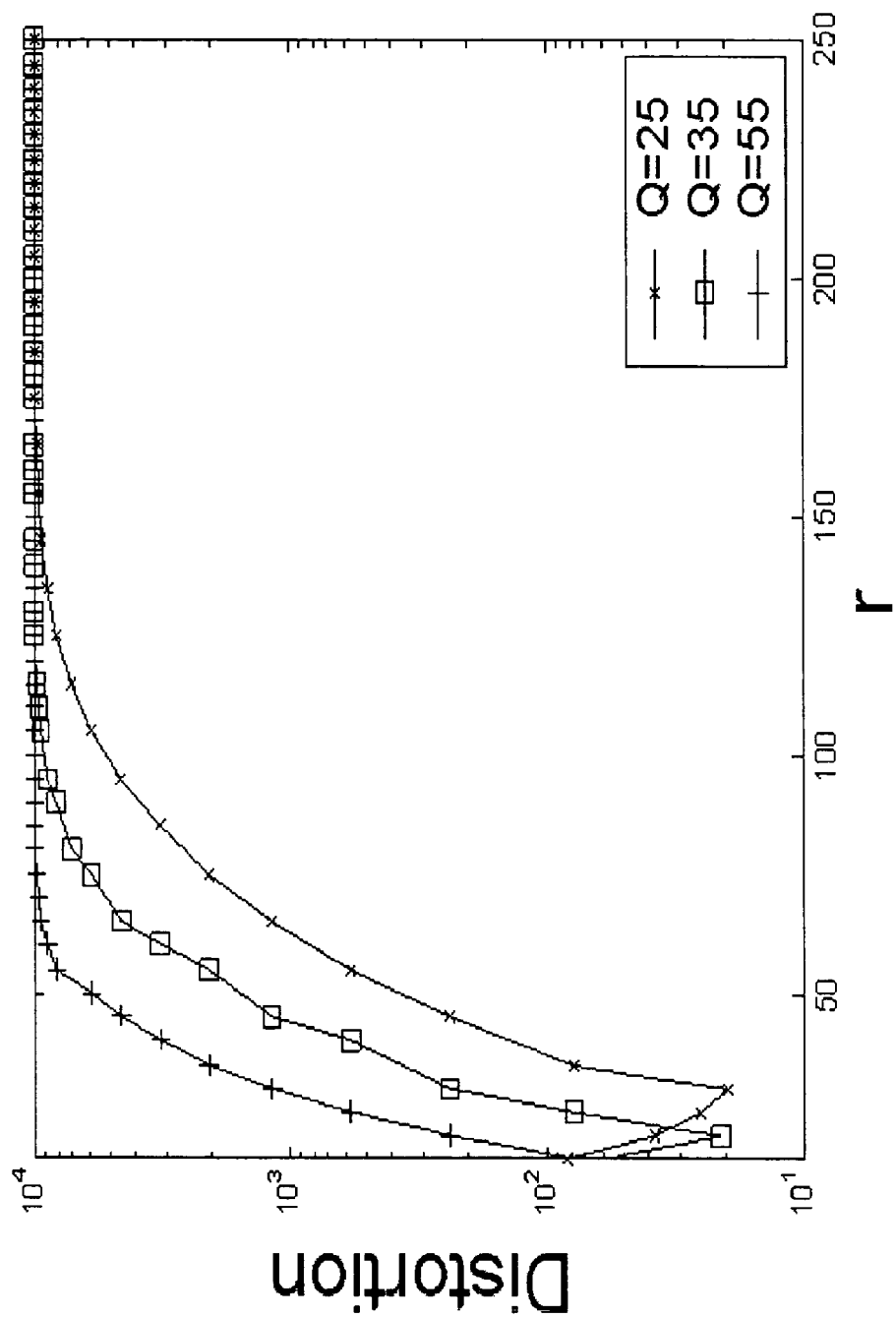
FIG. 11 is a graph illustrating distortion-description bit rate curves with a fixed number of descriptions M=32 in an exemplary embodiment consistent with the present invention.

As an example, consider a network with N=100 nodes. Suppose the uplink bandwidth at each node is $C_u$=250 kbps and the peer connectivity probability is p=0.9. How the average distortion changes as a function of Q and r is investigated. (It has already been proven that the average distortion decreases with increasing M.) Search over rates r from 10 kbps to the peer uplink bandwidth 250 kbps, and the number of sessions Q from 10 to 300. FIG. 11 is a graph illustrating distortion-description bit rate curves with a fixed number of descriptions M=32 in accordance with the given example.

From FIG. 11, notice that when r is greater than some value (around 25), the average distortion increases as r becomes larger. As r decreases, the total rate of each video, M r, decreases but the number of descriptions per session increases (since m=$XC_u$/Qr). If the total rate is near the flat tail of an R-D curve, the decrease in total rate has little negative impact on video quality but an increase in the number of descriptions per session provides stronger resilience to network loss. The more reliable network offsets the video quality degradation due to smaller total rate. However, when r is very small, the average distortion will increase as r decreases, since according to the R-D curve, $D(R_m)\sigma^2 \cdot 2^{-2R_m}$, the average distortion is large even if all descriptions are received.

Figure 12:
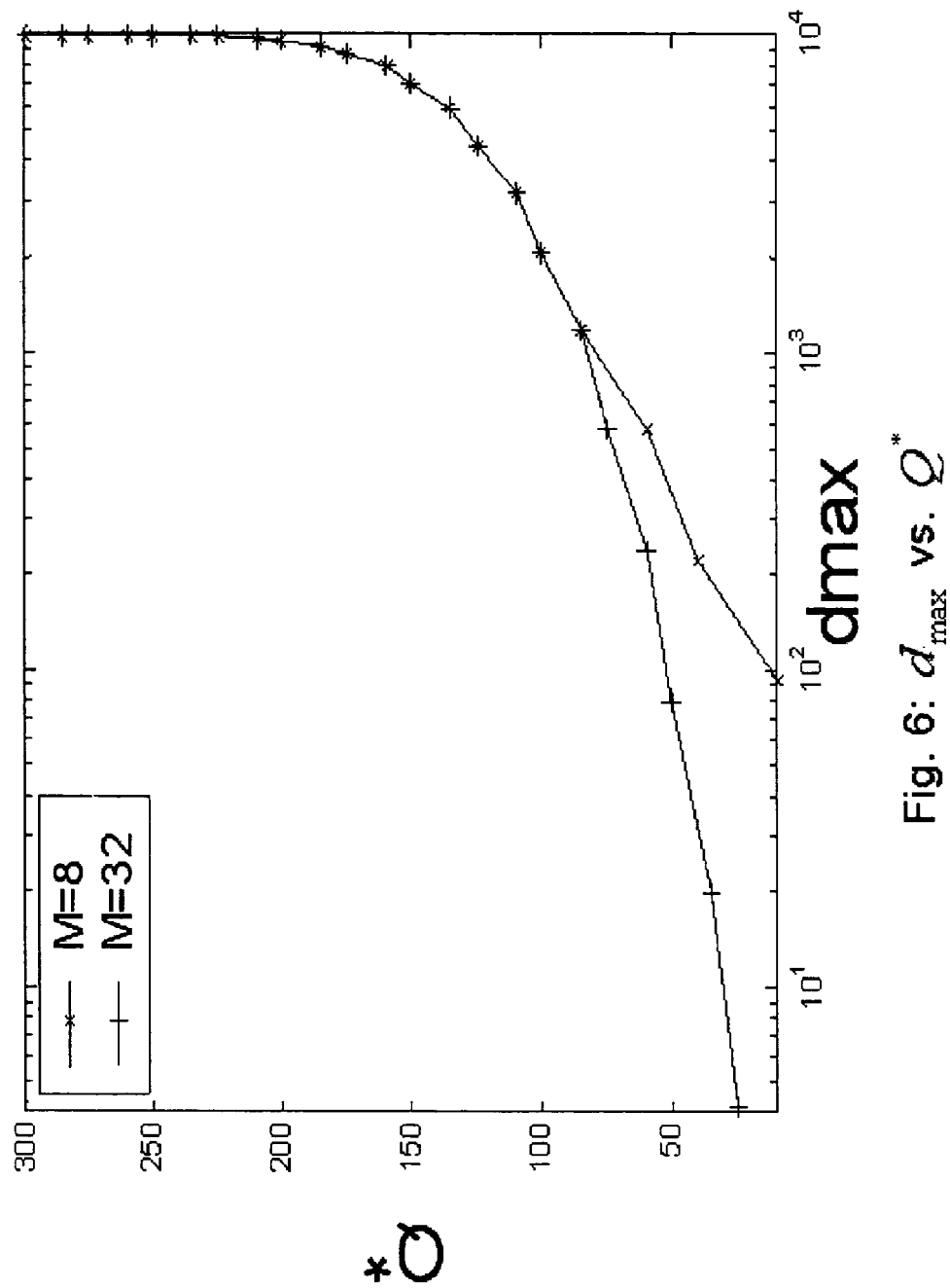
FIG. 12 is a graph illustrating number of session-distortion constraint curves in an exemplary embodiment consistent with the present invention.

FIG. 12 is a graph illustrating number of session-distortion constraint curves in an exemplary system consistent with the present invention. Recall that Q* denotes the maximum number of sessions. In FIG. 12 Q* is plotted as a function of the distortion constraint. Notice that Q* increases with $d_{max}$. For a given $d_{max}$, when M is larger, the $d_{max}$ is also greater. In FIG. 12, when $d_{max}$=10², for M=8, Q* is around 10, but for M=32, Q* is around 25, so that the system capacity more than doubles. Thus, the number of descriptions, M, can have a dramatic impact on performance. When $d_{max}$ is greater than about 5×10³, the curves for different M converge: when $d_{max}$ is large enough, the effect of M is negligible.

Note that thus far all provisioning, session, repository of videos and general management operations have been carried out by a central server within a network. However, it is also possible for these operations to take place at the peers themselves (e.g., without the help or management of a central server). Thus, such operations may occur in a decentralized manner.

Furthermore with MD coding, each sub-stream has the same importance. One alternative to MD coding is layered video. With layered video, the sub-streams (called layers) have varying importance. For the client to be able to make use of sub-stream m+1, the client must also be receiving sub-stream 1 through sub-stream m. Thus, with layered-encoded video, the lower layers are more important than the upper layers.

As with MD peer-to-peer VSNs, the design of a peer-to-peer VSN with layered video has five interacting components: (1) video coding; (2) sub-stream placement; (3) admission control; (4) sub-stream server selection; and (5) sub-stream delivery. However, the design for the layered-case will be different. With the MD system, all sub-streams can be treated equally in terms of sub-stream placement, server selection, and sub-stream delivery. This, as shown above, greatly simplifies the system design. On the other hand, the layered system provides unequal treatment to the sub-streams, to increase the likelihood of delivering the most important sub-streams. For example, for sub-stream placement, the optimal schemes will replicate more aggressively the lower layers than the upper layers. For admission control, a new session may be admitted as a function of how many layers the session requires. Some of the layers may have a higher rate than others, which will influence the design of the server selection. With proper unequal treatment of layers, the layered approach may be more efficient in utilizing the peer resources (that is, can serve more requests for the same target decoding quality), but this higher efficiency would likely be obtained at higher design and operational cost.

§4.4.5 Business Models

A P2P VSN such as one of those described above may be operated under one or more of the following business models.

As one example, functionality described above may be implemented on a set-top box. Participation as a peer server may help subsidize the cost of a movie, a video file, and/or the set-top box itself. Participation in the P2P VSN may be transparent to the user.

Alternatively, or in addition, advertising may be used to help subsidize the cost of a movie, a video file, and/or a set-top box.

Alternatively, or in addition, subscription fees and/or per download fees may be imposed.

§4.4.6 Provisioning

In at least some embodiments consistent with the present invention, popularity estimates may be used when determining how to divide a video into sub-stream and on which server peers to save them.

§4.4.7 Session Management

In at least some embodiments consistent with the present invention, a centralized server may provide redundant peer server information to a peer client in anticipation of one or more of the server peer failing. This can minimize various communications and/or delays in the event that a server peer fails and a backup is needed to maintain acceptable video quality.

In at least some embodiments consistent with the present invention, a centralized management facility can establish sessions between a client peer and appropriate server peers. In alternative embodiments consistent with the present invention, a centralized management facility can provide server peer identifiers to the client peer and/or a client peer identifier to the server peers so that the client peer and/or server peers can initiate the establishment of sessions themselves.

§4.4.8 Location of Management Functions

As illustrated in FIG. 1, various functions such as session management, provisioning, etc. can be performed at one or more dedicated management facilities. However, in at least some alternative embodiments consistent with the present invention, at least some of these functions can be distributed to various peers of the P2P VSN. Similarly, as illustrated in FIG. 1, peer and content information is stored at one or more dedicated management facilities. However, in at least some alternative embodiments consistent with the present invention, at least some of this information can be distributed to various peers of the P2P VSN.

§4.5 EXAMPLES

§4.5.1 Simple Example

Figure 13:
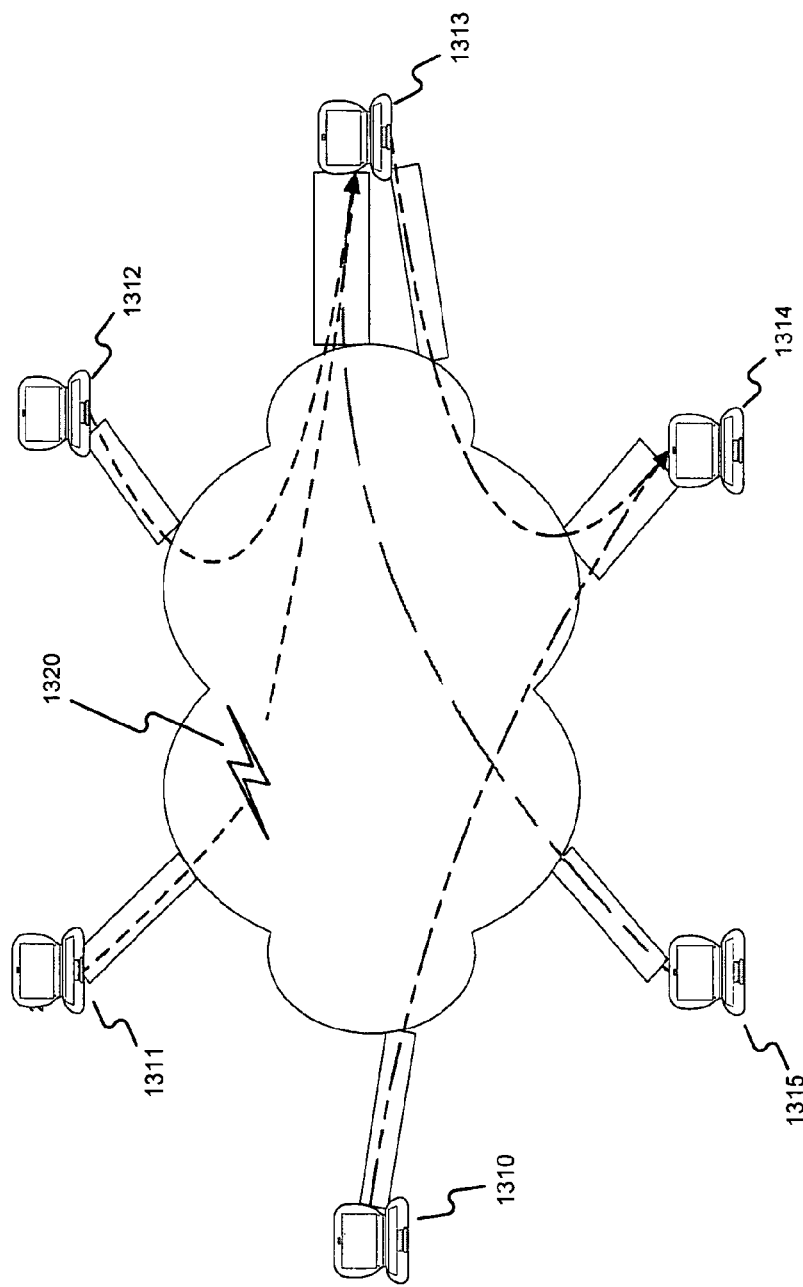
FIG. 13 illustrates a simple example of a network wherein P2P video streaming occurs in a manner consistent with the present invention.

Consider a simple example of a peer-to-peer video streaming network as depicted in FIG. 13. The network includes peers 1310-1315.

In this example peers 1313 and 1314 are each receiving a video. Initially, peer 1313 is receiving sub-streams from peers 1311 and 1312. Peer 1314 is receiving sub-streams from peers 1310 and 1313. The connection of peers is depicted using dashed lines. Also a fat pipe (depicted as a thicker rectangle) next to a peer represents a downlink and a thin pipe (depicted at a thinner rectangle) next to a peer represents an uplink. Now, assume that at some instant peer 1311 becomes disconnected from the network or otherwise becomes unable to serve its sub-stream. This is depicted by 1320. Since peer 1311 is disconnected, visual quality at peer 1313 is degraded. The system will be informed of this degradation and will seek to locate and establish a replacement peer containing the sub-stream that peer 1311 was providing to peer 1313. In this example, the system recovers by assigning peer 1315 as a replacement and the video quality at peer 1313 is restored. Generally, a peer can function as a client only, a sever only, or simultaneously as a sever and a client (e.g., peer 1313)

§4.5.2 Simulations

The previous section presented an analytical model for the system under a number of homogeneity assumptions. The model led to a simple optimization procedure for finding the optimal system parameters. It was shown that system performance will improve as the number of descriptions for the videos increases and the case for the theoretical Gaussian source model was investigated. In this section, the performance results of extensive simulations of an exemplary P2P video streaming scheme consistent with the present invention are presented. Real video data was used and each node was assumed to have limited storage.

The Foreman video sequence was coded in CIF (352×288) resolution into a scalable bit stream using the MPEG-4 FGS (See, e.g., MoMusys code, "MPEG4 verification model version 18.0," *ISO/IEC JTC1/SC29/WG*11 *Coding of Moving Pictures and Audio*, (January 2001), incorporated herein by reference.), at a base layer rate of 150 kbps. Each Group of Frames (GOF) had the duration of T=1 second and comprises 15 frames. The output bits from each GOF were converted to M descriptions using the MD-FEC method, where M is varied from 4 to 32. The total rate of a video after MD-FEC was set to be either 512 kbps, 576 kbps or 640 kbps.

§4.5.2.1 Network Setting

In the simulations, a homogeneous system in which each peer had the same uplink bandwidth (250 kbps) and storage capacity (230 MBytes) was assumed. For example, if the total rate is 512 kbps and M=4, each node with this storage capacity can store at most two (2) descriptions. There were 300 nodes in the network. Each node in the network alternated between "connect" and "disconnect" status. The connect time was modeled as an exponentially distributed random variable with mean four (4) hours. Similarly, the disconnect time was another exponentially distributed random variable with mean one (1) hour.

Assume J=50 videos. Each video had the same size but not the same popularity, and the popularity of these videos followed the Zipf distribution with parameter a=1.1. The number of new requests for all videos was modeled as a Poisson process with rate of λ=1.5 requests/min. The length of each video was two (2) hours. The number of copies $b_j$ for each video was proportional to its request rate. Each node stored at most one description for a particular video.

When a node requested a video, a central manager tried to find M serving nodes that have the M descriptions of the video, with each node also having sufficient surplus uplink bandwidth to serve one description. For each description, the server that was the least loaded over all servers that had this description was chosen. If during service a node disconnected, the central server looked for a replacement node that had the same description and sufficient uplink bandwidth. If there was no such node available, the central server kept searching in the next update interval.

Admission Policy Parameter $Q_{max}$ was set. If the total number of sessions in the network was greater than $Q_{max}$, then the new requests were blocked. In the simulations, six values for $Q_{max}$—60, 80, 100, 120, 150 and 180—were chosen.

Placement Policy Assume N nodes ordered from $\{1, 2, \ldots, N\}$ and the sorted popularity list of all videos $\{b_1, b_2, \ldots, b_J\}$, with $b_1$ being the most popular video and $b_J$ being the least popular video. An index I(j, m, i) was assigned to the $i^{th}$ copy of the $m^{th}$ description for the $j^{th}$ video. The index was calculated as follows:

$$I(j, m, i) = \sum_{k=1}^{j-1} M \cdot b_k + b_j \cdot (m-1) + i$$

The description indexed by I(j, m, i) was put on the node I(j, m, i) mod N.

§4.5.2.2 Simulation Results

Figure 14:
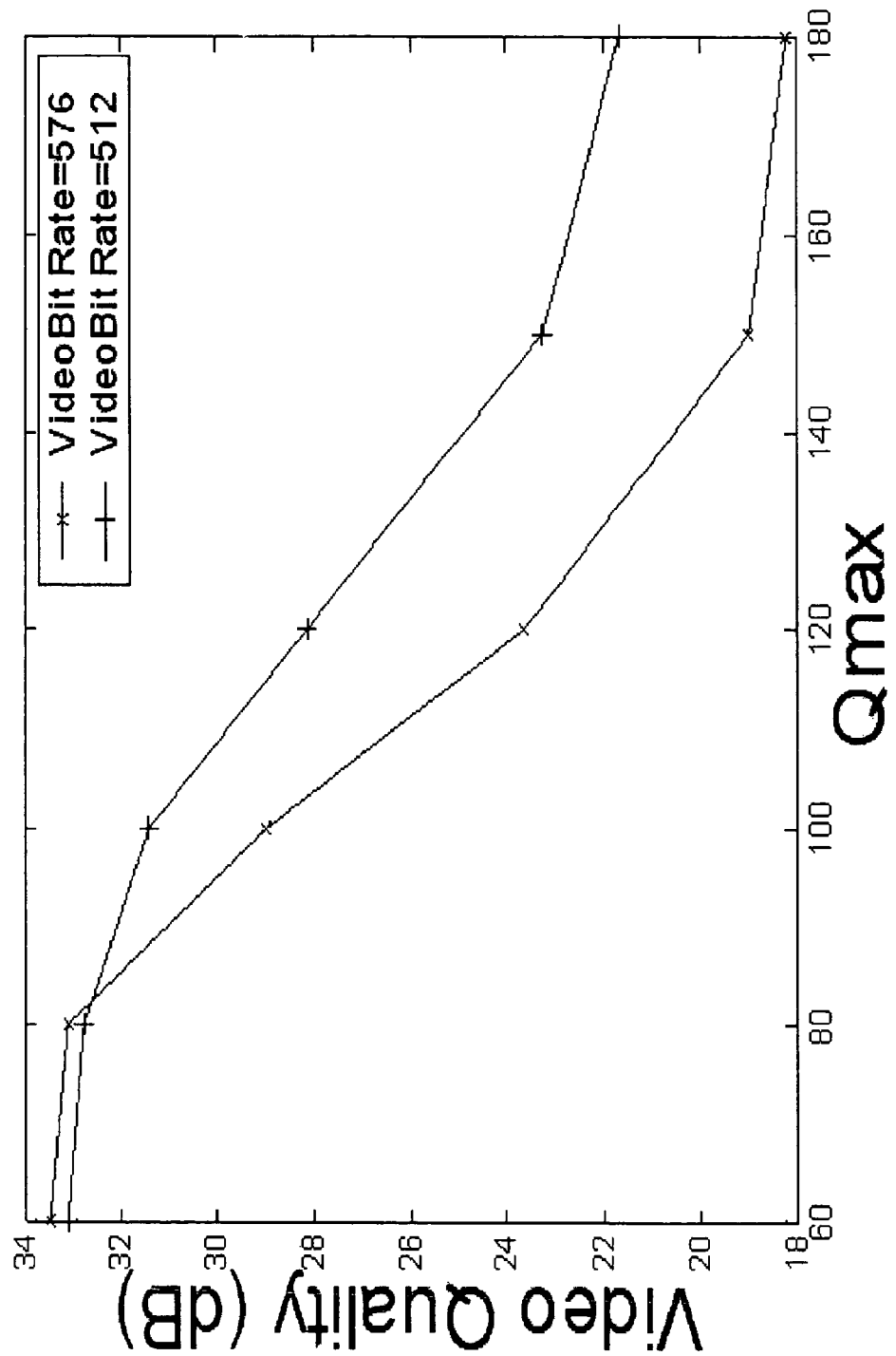
FIG. 14 is a graph illustrating video quality-maximum number of session curves, which describe the effects on video quality based on the maximum number of sessions occurring within an exemplary embodiment consistent with the present invention.

The affect of the admission control parameter $Q_{max}$ on the system performance is described. As the admission control parameter $Q_{max}$ increases, more sessions will be admitted into the system and it becomes increasingly difficult to provide each session with sufficient descriptions. Therefore, the video quality will decrease as $Q_{max}$ increases. FIG. 14 shows how the video quality changes as $Q_{max}$ increases for M=32. Simulations with two different total rates: 512 kbps and 576 kbps, were run. From FIG. 14, notice that when $Q_{max}$ is small, a higher total rate gives a better video quality. This is because when $Q_{max}$ is small, the network is lightly loaded, which means that the descriptions are less likely to be lost, and the increase in total rate gives a better video quality. However, when $Q_{max}$ is large, as seen from FIG. 14, a smaller total rate provides a better video quality.

As the total rate of each video increases, the video size increases as well. Since the total storage is fixed, the number of copies for each video will decrease, thus the overall serving capacity for each video decreases. If during the streaming interval, a node goes down, it is less likely to find a replacement node. Although the increase in total rate gives a better video quality, for a higher rate, each session receives, on the average, a smaller number of descriptions. Therefore, when the network is heavily loaded, a smaller total rate has a better video quality.

Figure 15:
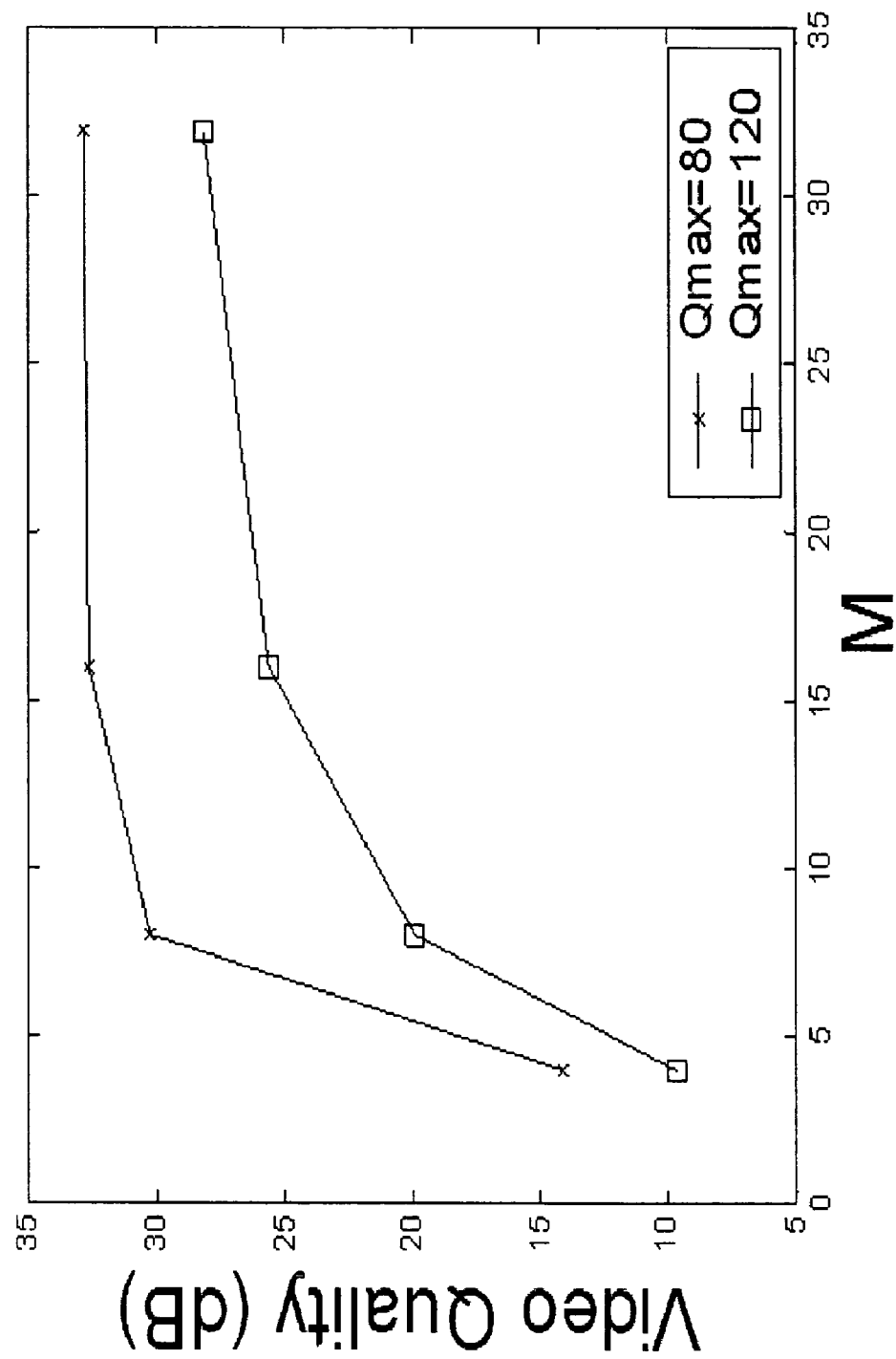
FIG. 15 is a graph illustrating video quality-description number curves which show how the video quality varies with the description numbers for a fixed total rate of 512 kbps in an exemplary embodiment consistent with the present invention.

FIG. 15 shows how the video quality varies with the description numbers for a fixed total rate of 512 kbps. Notice that the PSNR improves as the number of descriptions increases, but the improvement gradually levels off as M becomes very large. Note that this is consistent with the theorem, introduced above, which assumed an idealized model. One reason that increasing the number of descriptions is better is that the MD-FEC redundancy is optimally determined based on the description loss distribution determined from the network simulation. When M is large, MD-FEC can apply unequal error protection with finer granularity (because the same bit is split into more layers), thus requiring lower total redundancy and leaving more bits for source coding. Another reason is that when M is small, the rate r is large; since the uplink bandwidth is limited, some of the bandwidth will be wasted. For example, in the simulations with uplink bandwidth 250 kbps, when the total rate is 512 kbps and M=4, the r is 128 kbps. Thus each node can only serve one streaming session and the rest of the bandwidth 250−128=122 kbps is wasted.

Figure 16:
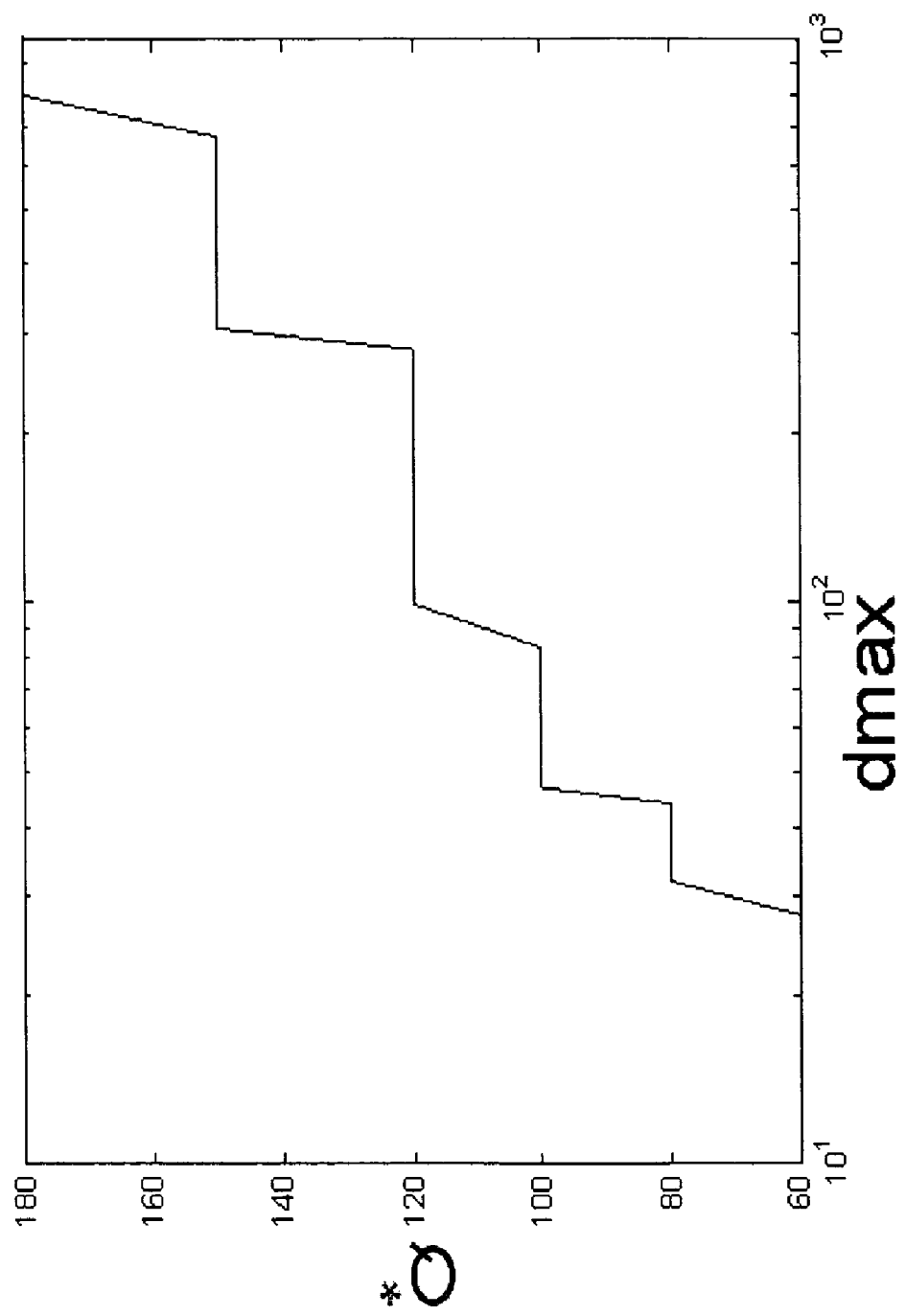
FIG. 16 is a graph illustrating the maximum amount of sessions that a network can support as a function of the distortion constraint in an exemplary embodiment consistent with the present invention.

In FIG. 16, Q* (which is the maximum number of sessions that the network can support to meet the distortion constraint) is plotted as a function of the distortion constraint. The parameters M and r (to calculate the average distortion) are changed. Then for each calculated distortion, the maximum Q from 60, 80, 100, 120, 150 and 180, which is Q*, is chosen. As expected, Q* increases with $d_{max}$. Recall one possible design criterion is to maximize the acceptance probability while meet a target video quality constraint. For a given $d_{max}$, one can determine the Q*, which is the maximum number of sessions that the network can support to meet this distortion constraint. If a lower video quality is required, more sessions can be admitted into the network, or less sessions can be accepted, to obtain a better video quality.

§4.6 CONCLUSIONS

Coding a video into multiple descriptions/sub-streams and distributing the descriptions/sub-streams to separate server peers in a manner consistent with the present invention has many benefits. First, when a video sub-stream server peer is lost, it only causes temporary loss of a single description/sub-stream, which has limited impact on received video quality. Second, each description/sub-stream has a rate much lower than the total rate of the video, thus reducing the required uplink bandwidth at each server peer. Note that for high-quality video streaming applications, the rate of an entire video may exceed the uplink bandwidth of most video sub-stream server peers. In such situations, splitting a video across multiple video sub-stream server peers not only helps to enhance system reliability, but also circumvents the problem of asymmetric bandwidth at the network access link. Third, streaming from multiple server peers helps spread the load of serving the video over the video sub-stream serving peers. Fourth, from the video publisher's perspective, it is undesirable to store an entire video on any one peer. This helps prevent a peer from having illegal and/or unauthorized access to the video (e.g., for purposes of unauthorized playing, copying, and/or distribution). Finally, another side benefit is that the use of multiple lower bandwidth sub-streams typically leads to improved multiplexing gains in the core Internet, thus allowing for an increased loading for a given Quality of Service (QoS) objective.

What is claimed is:

1. A client node, comprising:
   a connection to a peer-to-peer video serving network, the network comprising a plurality of peer nodes, each peer node being capable of acting as at least one of a client peer and a server peer;
   a computing device comprising a processing unit,
   a memory coupled to said computing device, the memory having stored thereon computer instructions that in response to execution cause the computing device to:
   request by way of the connection video data from a peer of the peer-to-peer video serving network;
   receive from a plurality of identified server peers a plurality of descriptions, each description comprising coded information indicative of video data;
   assemble video data from the received descriptions of the video data; and
   receive a description of video data from at least one alternative peer after a determination that the quality of the assembled video data is unacceptable based on a distortion constraint.

2. The client node as recited in claim 1, wherein the computer instructions that cause the computing device to request video data further cause a request for the video data to be transmitted to a session manager that identifies the plurality of server peers.

3. The client node as recited in claim 1, wherein the computer instructions that cause the computing device to assemble the video data cause the assembly to be initiated when the client node receives a description from less than all of the identified server peers.

4. The client node as recited in claim 3 wherein the computer instructions further cause the computing device to determine the quality of the assembled video data based on the number of descriptions that are not received.

5. The client node as recited in claim 1 wherein the plurality of descriptions number greater than two.

6. The client node as recited in claim 1 wherein the descriptions are multiple description-forward error correction partitions.

7. The client node as recited in claim 1 wherein the client node is incorporated into a set top box.

8. A computer-implemented method for use in a peer-to-peer video serving network including a plurality of peer nodes:
   causing the storage of a plurality of video sub-streams on a plurality of identified peer nodes, wherein the peer nodes are configured to serve the stored sub-streams to requesting peers and the plurality of video sub-streams are operable to generate video content, and wherein the plurality of peer nodes are identified based on:
   a distortion constraint indicative of distortion between source video content and the generated video content; and
   a popularity of the source video content, wherein the popularity is indicative of a relative frequency that the source video content is requested.

9. The computer-implemented method as recited in claim 8 wherein a subset of the identified peer nodes are identified to a requesting peer that requests the video content.

10. The computer-implemented method as recited in claim 8 wherein an identified peer node is subsidized as a result of serving as a peer node.

11. The computer-implemented method as recited in claim 8 wherein the plurality of video sub-streams are selected as a function of the number of peer nodes in the network and a number of expected simultaneous sessions.

12. The computer-implemented method as recited in claim 8 wherein the distortion constraint is a function of the upload bandwidth of a selected peer node.

13. A method implemented on a computing device for delivery of video over a peer-to-peer network comprising a plurality of peers, comprising:
   dividing video data into a plurality of sub-streams where the number of the plurality sub-streams is based on a number of simultaneous video data transmission sessions;
   transmitting to a peer at least one of the plurality of sub-streams, where the peer is selected as a function of the probability that the selected peer will transmit the at least one of the plurality of sub-streams to a requesting peer resulting in a reconstruction of the video data that meets a distortion constraint, wherein the distortion constraint is indicative of distortion between the video data and the reconstruction of the video data; and
   identifying to a requesting peer the selected peer and a plurality of other peers that have stored thereon the plurality of sub-streams.

14. The method as recited in claim 13 wherein the video data is delivered to the requesting peer from the selected peer and the plurality of other peers resulting in a reassembly of the video data at the requesting peer based on the number of the plurality of sub-streams received and wherein the video data can be rendered by the requesting peer with less than all of the plurality of sub-streams.

15. The method as recited in claim 13 wherein the selected peer is selected based on the probability that a requesting peer will request particular video data.

16. The method as recited in claim 13 wherein the video data is a movie file.

17. The method as recited in claim 13 wherein the other peers that have stored thereon the plurality of sub-streams are selected to maximize the number of simultaneous video data transmission sessions.

18. The method as recited in claim 13 wherein the number of simultaneous video data transmissions sessions is based on uplink bandwidth between the plurality of peers.

19. The method as recited in claim 13 wherein the video data is divided into sub-streams by applying multiple description video encoding to the video data.

* * * * *

UNITED STATES PATENT AND TRADEMARK OFFICE
CERTIFICATE OF CORRECTION

PATENT NO.         : 7,986,637 B2
APPLICATION NO.    : 12/613388
DATED              : July 26, 2011
INVENTOR(S)        : Panwar et al.

It is certified that error appears in the above-identified patent and that said Letters Patent is hereby corrected as shown below:

Column 20, line 19, in Claim 13, delete "plurality sub-streams" and insert -- plurality of sub-streams --.

Signed and Sealed this
Thirteenth Day of March, 2012

David J. Kappos
*Director of the United States Patent and Trademark Office*